US012526650B2

United States Patent
Hatamian et al.

(10) Patent No.: US 12,526,650 B2
(45) Date of Patent: *Jan. 13, 2026

(54) CENTRAL CLOUD SERVER AND EDGE DEVICES ASSISTED HIGH SPEED LOW-LATENCY WIRELESS CONNECTIVITY

(71) Applicant: PELTBEAM INC., Sherman Oaks, CA (US)

(72) Inventors: Mehdi Hatamian, Mission Viejo, CA (US); Venkat Kalkunte, Saratoga, CA (US)

(73) Assignee: PELTBEAM INC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/216,803

(22) Filed: May 23, 2025

(65) Prior Publication Data

US 2025/0287226 A1    Sep. 11, 2025

Related U.S. Application Data

(63) Continuation of application No. 18/931,122, filed on Oct. 30, 2024, now Pat. No. 12,356,216, which is a
(Continued)

(51) Int. Cl.
*H04W 16/28*    (2009.01)
*H04W 4/38*    (2018.01)
*H04W 74/0808*    (2024.01)

(52) U.S. Cl.
CPC ............. *H04W 16/28* (2013.01); *H04W 4/38* (2018.02); *H04W 74/0808* (2013.01)

(58) Field of Classification Search
CPC .... H04W 16/28; H04W 4/38; H04W 74/0808
See application file for complete search history.

(56) References Cited

U.S. PATENT DOCUMENTS 8,195,190 B1    6/2012  Hou
8,675,667 B1    3/2014  DeMartino
(Continued)

OTHER PUBLICATIONS

Corrected Notice of Allowance in U.S. Appl. No. 17/449,991 dated Jan. 13, 2022.
(Continued)

*Primary Examiner* — Siren Wei
(74) *Attorney, Agent, or Firm* — CHIP LAW GROUP

(57) ABSTRACT

A first edge device includes a processor configured to capture sensing information of the surrounding area and periodically communicate the sensing information, which includes position and time-of-day data, to a central cloud server. Based on the obtained sensing information, the processor obtains initial access information and sets various parameters, including beam indices for uplink and downlink communication, a Physical Cell Identity (PCID) for base station connection, and a beam configuration to service user equipment (UEs). The first edge device also communicates beam alignment information to the central cloud server and correlates the beam alignment information with the sensing data to generate a connectivity-enhanced database that specifies time-of-day-specific beam alignment and wireless connectivity relationships. The processor dynamically adjusts the beam configuration based on real-time environmental conditions and UE demands in the surrounding area of the first edge device.

20 Claims, 9 Drawing Sheets

Related U.S. Application Data continuation of application No. 18/630,912, filed on Apr. 9, 2024, now Pat. No. 12,177,691, which is a continuation of application No. 18/468,858, filed on Sep. 18, 2023, now Pat. No. 11,979,753, which is a continuation of application No. 18/147,481, filed on Dec. 28, 2022, now Pat. No. 11,818,593, which is a continuation of application No. 17/649,193, filed on Jan. 27, 2022, now Pat. No. 11,558,757, which is a continuation of application No. 17/449,991, filed on Oct. 5, 2021, now Pat. No. 11,265,733, which is a continuation of application No. 17/341,857, filed on Jun. 8, 2021, now Pat. No. 11,159,958.

(56) References Cited

U.S. PATENT DOCUMENTS

| | | | |
|---|---|---|---|
| 10,530,453 | B1* | 1/2020 | Sung .................... H04B 7/0626 |
| 2004/0185863 | A1 | 9/2004 | Ogami |
| 2012/0021725 | A1* | 1/2012 | Rune .................... H04W 48/16 |
| | | | 455/411 |
| 2014/0248843 | A1 | 9/2014 | Johansson et al. |
| 2015/0230207 | A1 | 8/2015 | Wang et al. |
| 2018/0115958 | A1 | 4/2018 | Raghavan et al. |
| 2018/0332585 | A1 | 11/2018 | Kang |
| 2019/0335371 | A1 | 10/2019 | Shen |
| 2020/0257310 | A1* | 8/2020 | Du ......................... H04W 4/46 |
| 2020/0275402 | A1 | 8/2020 | Shi et al. |
| 2020/0403689 | A1 | 12/2020 | Rofougaran et al. |
| 2021/0036752 | A1 | 2/2021 | Tofighbakhsh et al. |
| 2021/0110170 | A1 | 4/2021 | Geissler et al. |
| 2021/0112425 | A1* | 4/2021 | Tran .................... H04B 7/0695 |
| 2021/0208992 | A1 | 7/2021 | Vega et al. |
| 2022/0083015 | A1 | 3/2022 | Leach et al. |

OTHER PUBLICATIONS

Non-Final Office Action for U.S. Appl. No. 18/147,481 dated Feb. 14, 2023.

Non-Final Office Action for U.S. Appl. No. 18/468,858 dated Nov. 29, 2023.

Non-Final Office Action for U.S. Appl. No. 18/630,912 dated Jul. 9, 2024.

Non-Final Office Action in U.S. Appl. No. 17/449,991 dated Dec. 3, 2021.

Non-Final Office Action in U.S. Appl. No. 17/649,193 dated Jun. 3, 2022.

Notice of Allowance for U.S. Appl. No. 17/649,193 dated Sep. 19, 2022.

Notice of Allowance for U.S. Appl. No. 18/147,481 dated Jun. 22, 2023.

Notice of Allowance for U.S. Appl. No. 18/468,858 dated Feb. 7, 2024.

Notice of Allowance for U.S. Appl. No. 18/630,912 dated Sep. 5, 2024.

Notice of Allowance in U.S. Appl. No. 17/341,857 dated Aug. 27, 2021.

Notice of Allowance in U.S. Appl. No. 17/449,991 dated Jan. 5, 2022.

\* cited by examiner

CENTRAL CLOUD SERVER AND EDGE DEVICES ASSISTED HIGH SPEED LOW-LATENCY WIRELESS CONNECTIVITY

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 18/931,122, filed on Oct. 30, 2024, which is a Continuation Application of U.S. Pat. No. 12,177,691, issued on Dec. 24, 2024, which is a Continuation Application of U.S. Pat. No. 11,979,753, issued on May 7, 2024, which is a Continuation Application of U.S. Pat. No. 11,818,593 issued on Nov. 14, 2023, which is a Continuation Application of U.S. Pat. No. 11,558,757 issued on Jan. 17, 2023, which is a Continuation Application of U.S. Pat. No. 11,265,733 issued on Mar. 1, 2022, which is a Continuation Application of U.S. Pat. No. 11,159,958 issued on Oct. 26, 2021. Each of the above referenced applications is hereby incorporated herein by reference in its entirety.

FIELD OF TECHNOLOGY

Certain embodiments of the disclosure relate to a wireless communication system. More specifically, certain embodiments of the disclosure relate to a central cloud server, an edge device, and a method for the central cloud server and edge devices assisted high speed low-latency wireless connectivity.

BACKGROUND

Wireless telecommunication in modern times has witnessed advent of various signal transmission techniques and methods, such as use of beamforming and beam steering techniques, for enhancing capacity of radio channels. Latency and the high volume of data processing are considered prominent issues with next generation networks, such as 5G. Currently, the use of edge computing in next generation networks, such as 5G and upcoming 6G, is an active area of research and many benefits has been proposed, for example, faster communication between vehicles, pedestrians, and infrastructure, and other communication devices. For example, it is proposed that close proximity of conventional edge devices to user equipment (UEs) may likely reduce the response delay usually suffered by UEs while accessing the traditional cloud. However, there are many open technical challenges for a successful and practical use of edge computing in the modern networks, especially in 5G or the upcoming 6G environment.

In a first example, it is known that fast and efficient beam management mechanism may be a key enabler in advanced wireless communication technologies, for example, in millimeter wave (5G) or the upcoming 6G communications, to achieve low latency and high data rate requirements. One major technical challenge of the mmWave beamforming is the initial access latency. During the initial access phase, a UE and or a conventional repeater device need to scan multiple beams to find a suitable beam for attachment, for example, using the standard beam sweeping operation in the initial access phase. This process may introduce considerable latency depending on the number of beams in a beam book and a baseband decoding hardware latency. Such latency becomes even more critical for mobile systems (e.g., when UEs are in motion) in which the channel, and hence beams or base stations, such as a gNodeB (gNB), may be rapidly changing. For example, currently, an average mmWave gNB handover time is on the order of 10-20 seconds, assuming about 500 meter of cell radius and a UE (e.g., a vehicle or a UE in the vehicle) travelling at the speed of 50 miles per hour (MPH), which is not desirable.

In a second example, Quality of Experience (QoE) is another open issue, which is a measure of a user's holistic satisfaction level with a service provider (e.g., Internet access, phone call, or other carrier network-enabled services). The challenge is how to ensure a seamless connectivity as well as QoE without significantly increasing infrastructure cost, which may be commercially unsustainable with present solutions.

In a third example, heterogeneity may be another issue, where many UEs may use different interfaces, radio access technologies (3G, 4G, 5G, or upcoming 6G), computing technologies (e.g., hardware and operating systems) and even one or more carrier networks, to communicate with the edge cloud. Such heterogeneity in wireless communication may further aggravate the challenges in developing a solution that is portable, practical, and upgradable across different environment.

In yet another example, how to consider the dynamic nature of surroundings is another open issue, especially for next generation networks, such as mmWave communication, that may adversely impact reliability in provisioning of consistent high-speed low latency wireless connectivity. In certain scenarios, the known challenges of mmWave, namely signal loss, poor reach, and easy blockage by moving or stationary objects in surroundings are amplified and uncertainty in achieving reliable wireless connectivity with QoE is increased as a result of the dynamic nature of surroundings, which is not desirable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A central cloud server, an edge device, and a method for the central cloud server and edge devices assisted high speed low-latency wireless connectivity for high performance communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a central cloud server, an edge device, and a method for the central cloud server and edge devices assisted high speed low-latency wireless connectivity for high performance communication. The central cloud server, the edge device, and the method of the present disclosure significantly reduces the latency involved in initial access phase by making the edge devices bypass the initial-access search. For example, the existing average mmWave gNB handover time that is on the order of 10-20 seconds for a moving device, is significantly reduced by approximately 60-90% depending on the location, speed, and orientation of a user equipment (UE), such as a vehicle or a smartphone, using an intelligent database that is trained previously, and may be referred to as a connectivity enhanced database that specifies a plurality of time-of-day specific uplink and downlink beam alignment-wireless connectivity relationships for a surrounding area of each of the plurality of edge devices independent of a plurality of different wireless carrier networks of different service providers. The central cloud server supports the plurality of different wireless carrier networks including different interfaces, radio access technologies, computing technologies (e.g., hardware and operating systems) and is easily upgradable without any need to change the infrastructure. Thus, the central cloud server in coordination with the plurality of edge devices ensures a seamless connectivity as well as Quality of experience (QoE) without significantly increasing infrastructure cost. Moreover, the central cloud server takes into account comprehensive sensing information surrounding each edge device. Thus, a dynamic nature of surroundings (e.g., any change in surroundings that has the potential to adversely impact signal propagation, cause signal loss, poor reach, or signal blockage by an object, such as a moving object or a stationary object, in the surroundings) is proactively handled and mitigated by the central cloud server by distributing a different subset of information from the connectivity enhanced database to each of the plurality of edge devices. Such distribution by the central cloud server may be done according to a corresponding position of the each of the plurality of edge devices that enables easy handling and mitigation of any adverse impact on signal propagation due to the dynamic nature of surroundings for consistent high-performance communication. In the following description, reference is made to the accompanying drawings, which form a part hereof, and in which is shown, by way of illustration, various embodiments of the present disclosure.

Figure 1:
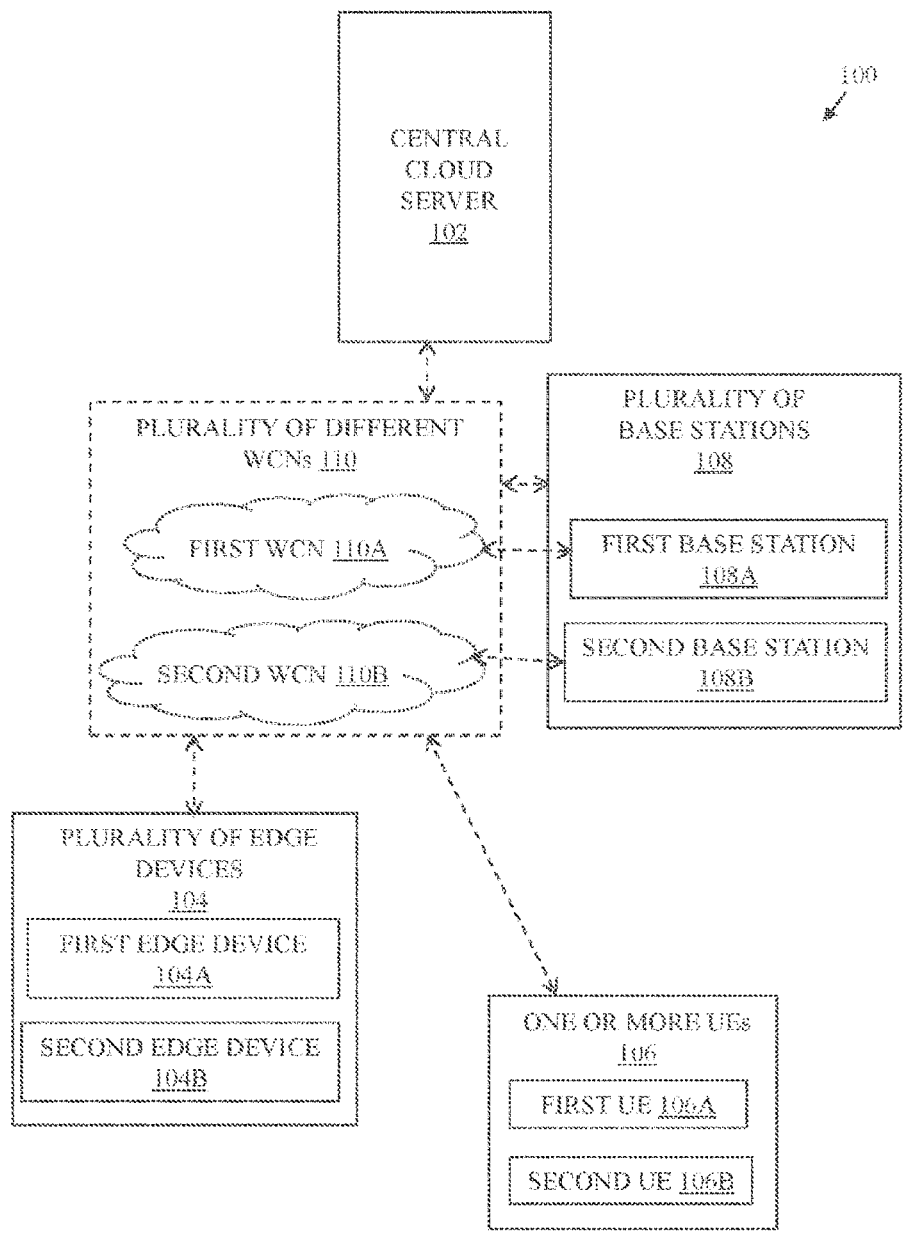
FIG. 1 is a network environment diagram illustrating various components of an exemplary communication system with a central cloud server and a plurality of edge devices, in accordance with an exemplary embodiment of the disclosure.

FIG. 1 is a network environment diagram illustrating various components of an exemplary communication system with a central cloud server and a plurality of edge devices, in accordance with an exemplary embodiment of the disclosure. With reference to FIG. 1, there is shown a block diagram 100 of a network environment that includes a central cloud server 102, a plurality of edge devices 104, one or more user equipment (UEs) 106, and a plurality of base stations 108. There is further shown a plurality of different wireless carrier networks (WCNs) 110, such as a first WCN 110A of a first service provider and a second WCN 110B of a second service provider.

The central cloud server 102 includes suitable logic, circuitry, and interfaces that may be configured to communicate with the plurality of edge devices 104, the one or more UEs 106, and the plurality of base stations 108. In an example, the central cloud server 102 may be a remote management server that is managed by a third party different from the service providers associated with the plurality of different WCNs 110. In another example, the central cloud server 102 may be a remote management server or a data center that is managed by a third party, or jointly managed, or managed in coordination and association with one or more of the plurality of different WCNs 110. In an implementation, the central cloud server 102 may be a master cloud server or a master machine that is a part of a data center that controls an array of other cloud servers communicatively coupled to it, for load balancing, running customized applications, and efficient data management.

Each edge device of the plurality of edge devices 104 includes suitable logic, circuitry, and interfaces that may be configured to communicate with the central cloud server 102. Each edge device of the plurality of edge devices 104 may be one of an edge repeater device, a relay device, a small cell, a customer premise equipment (CPE), a road side unit (RSU) device, or a UE controlled by the central cloud server 102, or an inference server. In an example, the UE may be controlled out-of-band, for example, in a management plane, by the central cloud server 102. In an implementation, some of the edge devices of the plurality of edge devices 104 may be deployed at a fixed location while some may be portable. For example, an edge device may be a fixed wireless access (FWA) device, a repeater device, a small-cell, or even an inference server (e.g., an edge cloud) deployed at a fixed location that covers a given geographical area. In another example, some edge devices, such as an edge repeater device may be installed in a vehicle and thus location of such edge repeater device may vary rapidly when the vehicle is in motion. Moreover, some edge device may be portable, and thus their location may change. In some implementation, an edge device may be a part of a telematics unit of a vehicle or implemented as a portable repeater device.

Each of one or more UEs 106 may correspond to a telecommunication hardware used by an end-user to communicate. Alternatively stated, the one or more UEs 106 may refer to a combination of a mobile equipment and subscriber identity module (SIM). Each of the one or more UEs 106 may be subscriber of at least one of the plurality of different WCNs 110. Examples of the one or more UEs 106 may include, but are not limited to a smartphone, a vehicle, a virtual reality headset, an augment reality device, an in-vehicle device, a wireless modem, a customer-premises equipment (CPE), a home router, a cable or satellite television set-top box, a VoIP station, or any other customized hardware for telecommunication.

Each of the plurality of base stations 108 may be a fixed point of communication that may communicate information, in form of a plurality of beams of RF signals, to and from communication devices, such as the one or more UEs 106 and the plurality of edge devices 104. Multiple base stations corresponding to one service provider, may be geographically positioned to cover specific geographical areas. Typically, bandwidth requirements serve as a guideline for a location of a base station based on relative distance between the plurality of UEs and the base station. The count of base stations depends on population density and geographic irregularities, such as buildings and mountain ranges, which may interfere with the plurality of beams of RF signals. In an implementation, each of the plurality of base stations 108 may be a gNB. In another implementation, the plurality of base stations 108 may include eNBs, Master eNBs (MeNBs) (for non-standalone mode), and gNBs.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of a network infrastructure to provide services to its subscribers over the licensed spectrum, for example, 4G LTE, or 5G spectrum (FR1 or FR2). For example, the first base station 108A may be controlled, managed, or associated with the first WCN 110A, and the second base station 108B may be controlled, managed, or associated with the second WCN 110B different from the first WCN 110A. The plurality of different WCNs 110 may also include mobile virtual network operators (MVNO).

Beneficially, the central cloud server 102 and the plurality of edge devices 104 exhibit a decentralized model that not only brings cloud computing capabilities closer to UEs in order to reduce latency, but also manifest several known benefits for various service providers associated with the plurality of different WCNs 110. For example, reduces backhaul traffic by provisioning content at the edge, distributes computational resources geographically in different locations (e.g., on premise mini cloud, central offices, customer premises, etc.,) depending on the use case requirements, and improves reliability of a network by distributing content between edge devices and the centralized cloud server 102. Apart from these and other known benefits (or inherent properties) of edge computing, the central cloud server 102 improves and solves many open issues related to the convergence of edge computing and modern wireless networks, such as 5G or upcoming 6G. The central cloud server 102 significantly improves beam management mechanism of 5G new radio (NR), true 5G, and creates a platform for upcoming 6G communications, to achieve low latency and high data rate requirements. Based on the various information acquired from the plurality of edge devices 104 over a period of time, the central cloud server 102 creates a connectivity enhanced database that specifies a plurality of time-of-day specific uplink and downlink beam alignment-wireless connectivity relationships for a surrounding area of each of the plurality of edge devices 104 independent of the plurality of different WCNs 110. This removes the complexity and substantially reduces the initial access latency as the standard beam sweeping operation in the initial access phase is bypassed and is not required to be performed at the end-user device or edge devices, which in turn improves network performance of all associated WCNs of the plurality of different WCNs 110. The central cloud server 102 is able to handle heterogeneity in wireless communication in terms of different interfaces, radio access technologies (3G, 4G, 5G, or upcoming 6G), computing technologies (e.g., hardware and operating systems) and even one or more carrier networks used by the one or more UEs 106. Moreover, the central cloud server 102 takes into account the dynamic nature of surroundings by use of the sensing information obtained from the plurality of edge devices 104 in real-time or near real time, to proactively avoid any adverse impact on reliability due to any sudden signal blockage or signal loss, thereby provisioning consistent high-speed low latency wireless connectivity. Thus, the central cloud server 102 manifest higher QoE as compared to existing systems.

Figure 2:
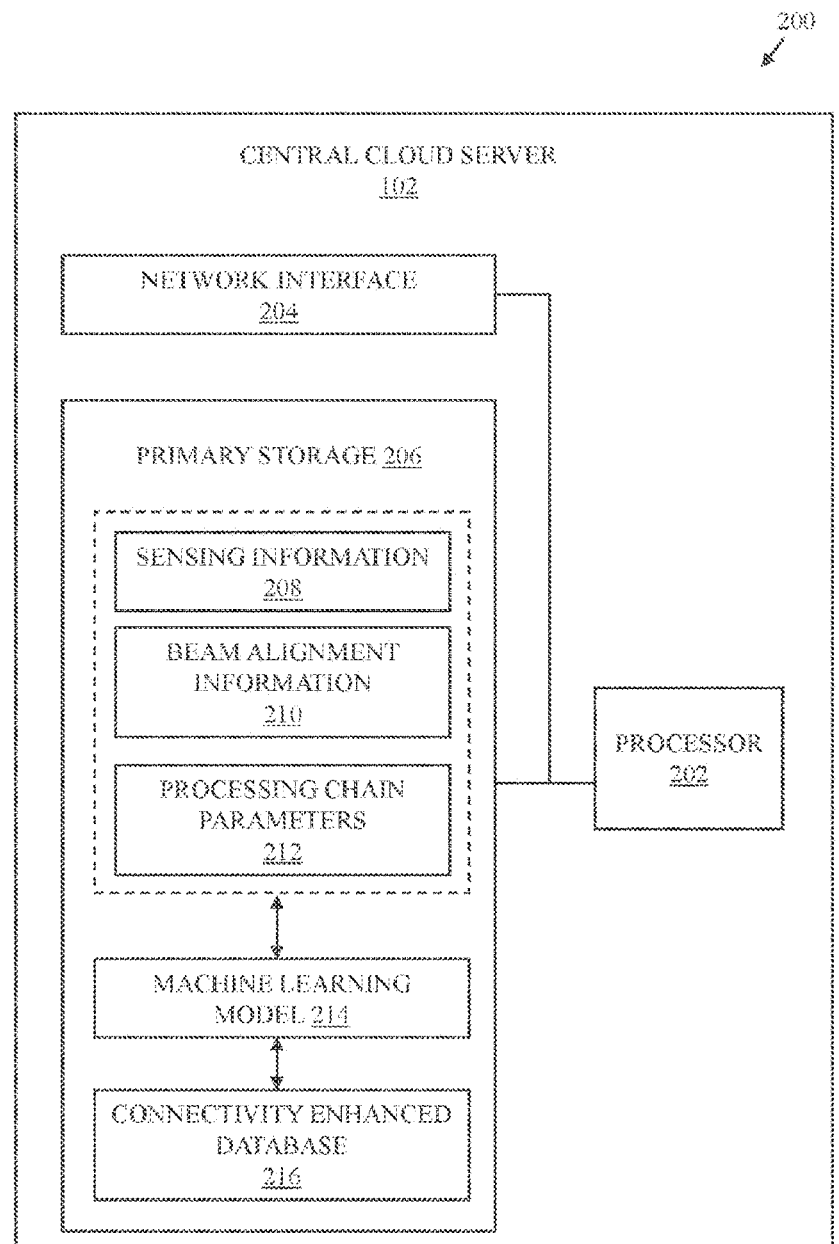
FIG. 2 is a block diagram illustrating different components of an exemplary central cloud server, in accordance with an embodiment of the disclosure.

FIG. 2 is a block diagram illustrating different components of an exemplary central cloud server, in accordance with an embodiment of the disclosure. FIG. 2 is explained in conjunction with elements from FIG. 1. With reference to FIG. 2, there is shown a block diagram 200 of the central cloud server 102. The central cloud server 102 may include a processor 202, a network interface 204, and a primary storage 206. The primary storage 206 may further include sensing information 208 and beam alignment information 210. In an implementation, the primary storage 206 may further include processing chain parameters 212. There is further shown a machine learning model 214 and a connectivity enhanced database 216.

In operation, there may be a training phase and an inference phase. In the training phase, the processor 202 may be configured to periodically obtain sensing information 208 from the plurality of edge devices 104. Each of the plurality of edge devices 104 may be deployed at different locations. For example, each of a first set of edge devices of the plurality of edge devices 104 may be an edge repeater device deployed at a corresponding fixed location to provide a non-line-of-sight (NLOS) transmission path between one or more base stations of the plurality of the base station 108 and one or more UEs, such as the one or more UEs 106. Similarly, each of a second set of edge devices of the plurality of edge devices 104 may be an edge device mounted on a vehicle, and thus its location may change rapidly when a corresponding vehicle on which the edge device is installed is in motion. In yet another example, some of the edge devices of the plurality of edge devices 104 may be UEs controlled by the central cloud server 102. The plurality of edge devices 104 may periodically sense its surroundings and communicate the sensed information, such as the sensing information 208, to the central cloud server 102. The machine learning model 214 of the central cloud server 102 may be periodically (e.g. daily and for different times-of-day) trained on data points that are uploaded to the central cloud server 102 from the plurality of edge devices 104.

In accordance with an embodiment, the sensing information 208 may comprise a position of each of the plurality of edge devices 104, a location of the one or more UEs 106 in the motion state or in the stationary state in the surrounding area of each of the plurality of edge devices 104, a moving direction of different UEs (such as the one or more UEs 106), a time-of-day, traffic information, road information, construction information, and traffic light information. The central cloud server 102 obtains such sensing information 208 and stores the data points of such sensing information 208 as input features. As the sensing information 208 is obtained periodically from various edge devices of the plurality of edge devices 104, all changes in the surroundings of each edge device is adequately captured and relayed to the central cloud server 102.

In accordance with an embodiment, the processor 202 may be further configured to generate supplementary information as insights based on a cross-correlation of data points of the obtained sensing information 208. When such data points of the sensing information 208 are cross-correlated with each other, supplementary information may be derived as insights by the central cloud server 102. For example, when traffic information of a surrounding area of the first edge device 104A having a first position is correlated with surrounding information at different times-of-day over a period of time, the processor 202 of the central cloud server 102 may be configured to determine a trend and a load associated with the first edge device 104A (and similarly for other edge devices) that may indicate an average number of UEs expected to be serviced by the first edge device 104A at different times-of-day, one or more peak load time periods, one or more off-peak time periods. The processor 202 may be further configured to determine how many edge devices are active or not active, which edge devices may be employed to increase the coverage and data throughput and reduce latency, and the like.

In another example, more supplementary information may be derived as insights taking into account traffic information, road information, construction information, and traffic light information, and other sensed information. Each edge device of the plurality of edge devices 104 may use its own sensing mechanism, such as a sensing radar, to sense its surrounding environment and map its surrounding three-dimensional (3D) environment to generate a 3D environmental representation. The 3D environmental representation may indicate movable and immobile physical structures in the surrounding area of each of the plurality of edge devices 104. In some implementations, each edge device of the plurality of edge devices 104 may be configured to utilize external sensing devices, such as Lidar, camera, accelerometer, Global Navigation Satellite System (GNSS), gyroscope, or Internet-of-Things (IoT) devices (e.g. video surveillance devices, roadside sensor systems for measuring speed, local road conditions, local traffic, and the like) located within its communication range to acquire sensing information 208 from such external devices. For example, an edge device may be an edge repeater device mounted on a vehicle and communicatively coupled to different in-vehicle sensors via an in-vehicle network, so as to acquire the sensing information 208 from such in-vehicle sensors (i.e. the external sensors) in real time or near time.

In accordance with an embodiment, the sensing information 208 may further comprise a distance of each of the plurality of edge devices 104 from the one or more UEs 106 and other movable and immobile physical structures in the surrounding area of each of the plurality of edge devices 104. In an implementation, the distance of each of the plurality of edge devices 104 from one or more UEs within its range, such as the one or more UEs 106, and other movable and immobile physical structures in the surrounding area of each of the plurality of edge devices 104, may be determined at each of the plurality of edge devices 104 or at least some edge devices of the plurality of edge devices 104, and then communicated to the central cloud server 102 as the sensing information 208. In some implementations, the central cloud server 102 may be configured to determine such distance based on the position information received from the plurality of edge devices 104. Additionally, the processor 202 of the central cloud server 102 may be configured to cross-correlate the distances using the generated 3D environmental representation for a given surrounding area of a given edge device for higher accuracy.

In an example, the processor 202 may be further configured to determine distance of each edge device (e.g. an edge repeater device) from its surrounding objects, such as other vehicles, buildings, or edges of a building, distance of one or more serving base stations of the plurality of base stations, trees, and other immobile physical structures (such as reflective objects) or other mobile objects. Moreover, Lidar information from vehicles, information from a navigation system (such as maps, for example, identifying cross-sections of streets), satellite imagery of buildings of a surrounding area, bridges, any signal obstruction from a change in construction structure etc., may be stored in the cloud, such as the central cloud server 102.

The machine learning model 214 of the central cloud server 102 may be periodically (e.g. daily and for different times of day) updated on such data points in real time or near time. The central cloud server 102 may be further configured to cause the machine learning model 214 to find correlation among such data points to be used for a plurality of predictions and formulate rules to establish, maintain, and select one or more edge devices in advance for various traffic scenarios to serve UEs and to identify improved (e.g., optimal) signal transmission paths to reach to UEs and for efficient handover for a wireless connectivity at a later stage (i.e., in the inference phase). Based on the sensing information 208 obtained from the plurality of edge devices 104, the processor 202 may be further configured to detect where reflective objects are located and used that information in radiation pattern of the RF signals, such as 5G signals. The sensing information 208 may be used to make radiation pattern that is correlated to areas such that the communicated RF signals are not reflected back. This means that when one or more beams of RF signals are communicated from the plurality of edge devices 104, comparatively significantly lower or almost negligible RF signals are reflected back to the plurality of edge devices 104. The location of the reflective objects and the correlation of the areas associated with reflective objects with the radiation pattern to design enhanced or most suited beam configurations may be further used by the processor 202 to formulate rules for later use.

In accordance with an embodiment, the sensing information 208 may further comprise weather information. The processor 202 may be further configured to utilize the weather information to determine one or more changes in a performance state of each of the plurality of edge devices 104 in servicing the one or more UEs 106 in its surrounding area in different weather conditions. It is known that more attention is provided in the region between 30-300 GHz frequencies due to the large bandwidth which is available in this region to enable the plurality of different WCNs 110 to cope with the increasing demand for higher data rates and ultra-low latency services. However, the signals at frequencies above 30 GHz may not propagate for long distances as those below 30 GHz. Moreover, there is signal attenuation due to weather factors, such as humidity, rain, ice, and even there is a difference observed during summer and winter on the signal power level. For example, the signal loss difference between winter and summer for 28 GHZ may be about 1 dB, about 2 dB for 37 GHz, about 4 dB for 60 GHz. Losses may increase with frequency and distance. The processor 202 utilizes such weather information to determine one or more changes in a performance state of each of the plurality of edge devices 104 in servicing the one or more UEs 106 in its surrounding area in different weather conditions, and accordingly may learn a correlation between different weather condition and signal power level and other performance state of each of the plurality of edge devices 104 in servicing the one or more UEs 106 in its surrounding area. Accordingly, the processor 202 may be further configured to formulate rules to establish, maintain, and select one or more edge devices in advance to mitigate signal losses in various weather conditions to serve UEs and to identify improved (e.g., optimal) signal transmission paths to reach to UEs via the edge devices at a later stage (i.e., in the inference phase). For example, the processor 202 may be further configured to cause the one or more edge devices to select a most appropriate beam configurations or radiation pattern in real time or near real time in accordance with the weather condition obtained as a part of the sensing information 208 (i.e., in the inference phase).

The processor 202 may be further configured to periodically obtain beam alignment information 210 from the plurality of edge devices 104. The beam alignment information 210 may be obtained and stored for the plurality of different WCNs 110. In an implementation, the beam alignment information 210 received by the central cloud server 102 from the plurality of edge devices 104 during the training phase may comprise one or more of a transmit (Tx) beam information, a receive (Rx) beam information, a Physical Cell Identity (PCID), and an absolute radio-frequency channel number (ARFCN), and a signal strength information associated with each of Tx beam and the Rx beam of the plurality of edge devices 104.

The processor 202 may be further configured to correlate the obtained sensing information 208 and the beam alignment information 210 for different times-of-day such that the connectivity enhanced database 216 is generated that specifies a plurality of time-of-day specific uplink and downlink beam alignment-wireless connectivity relationships for a surrounding area of each of the plurality of edge devices 104 independent of the plurality of different WCNs 110. The correlation indicates that for a given set of input features extracted from the sensing information 208, what is the most suitable (i.e. best) initial access information for a given edge device according to its position to service one or more UEs in its surrounding area such that a high-speed and low latency wireless connectivity can be achieved with increased consistency for different times-of-day. The connectivity enhanced database 216 may be a low-latency database, for example, "DynamoDB", "Scylla", or other proven and known low-latency databases that can handle one or more million transactions per second on a single cloud server. The time-of day specific uplink beam-alignment-wireless connectivity relation specifies, for the given set of input features for a given time-of-day, which beam index to set at an edge device for the uplink communication, a specific Physical Cell Identity (PCID) which indicates which gNB to connect to, or which WCN to select, which specific beam configuration to set, or whether a connection to the base station is to be established directly or indirectly in a NLOS path using another edge device (e.g. another edge repeater device) in a network of edge devices depending on the current location of the edge device. Similarly, the time-of day specific downlink beam-alignment-wireless connectivity relation specifies, for the given set of input features for a given time-of-day, which beam index to set at an edge device for the downlink communication, which WCN to select, which specific beam configuration to set, what power level of the RF signal may be sufficient, or an expected time period to service one or more UEs, such as the first UE 106A, depending on the current location of the edge device. Thus, as the set of input features changes, the initial access information also changes for the given edge device according to changed set of input features to continue servicing the one or more UEs, such as the first UE 106A, in its surrounding area without any drop in QoE. Moreover, as the plurality of time-of-day specific uplink and downlink beam alignment-wireless connectivity relationships for the surrounding area of each of the plurality of edge devices 104 is independent of the plurality of different WCNs 110, the complexity and the initial access latency is significantly reduced as the standard beam sweeping operation in the initial access phase is bypassed and is not required to be performed at the end-user device or edge devices, which in turn improves network performance of associated WCNs of the plurality of different WCNs 110. Furthermore, this way a consumer, such as the first UE 106A, is provided with the capability to choose which WCN (i.e. which service provider) they like to connect to, and this is enabled from the cloud, such as the central cloud server 102. The processor 202 may be configured to transfer such specific initial access information associated with a WCN, such as the first WCN 110A to the edge device, such as the first edge device 104A, where such specific initial access information is used by the edge device to establish wireless connectivity by passing conventional initial-access search. Thus, a consumer with a UE, such as the first UE 106A, subscribed to the first WCN 110A can request the edge device, such as the first edge device 104A, to relay an RF signal of the first WCN 110A, and if the consumer with the UE, such as the first UE 106A, is subscribed to the second WCN 110B can request the edge device, such as the first edge device 104A, to relay an RF signal of the second WCN 110B.

In an implementation, the processor 202 may be further configured to extract and tag parameters of the beam alignment information 210 as learning labels. The obtained sensing information 208 may be considered as input features, whereas the beam alignment information 210 may be considered as learning labels for the correlation. The processor 202 may be further configured to execute a mapping of the learning labels with one or more features of the obtained sensing information 208 until the plurality of time-of-day specific uplink and downlink beam alignment-wireless connectivity relationships is established for the surrounding area of each of the plurality of edge devices 104. In an implementation, a machine learning algorithm, for example, an artificial neural network algorithm, may be used at the beginning before training with the real-world training data of input features and parameters of the beam alignment information 210 as supervised learning labels. When the machine learning algorithm is passed through the training data of correlated input features and parameters of the beam alignment information 210, the machine learning algorithm determines patterns such that the input features (e.g. distance of edge device with a UE, weather condition, a UE location, moving direction, time-of-day, etc.) are mapped to the learning labels (e.g., best initial access information, such as best PCID, best beam index to be used, signal strength measurement of a Tx/Rx beam, beam configuration, best transmission path, an absolute radio-frequency channel number (ARFCN) etc.). Since the machine learning model 214 is trained periodically, so if the base station (e.g. a gNB) configuration is changed (e.g., a new sector or gNB is added or the PCID, ARFCN is changed) the machine learning model 214 quickly adapts to the change. The processor 202 is further configured to cause the machine learning model 214 to assign more weight to recent data points using, for example, an exponential time decay process. In an example, the hyperparameters of the machine learning model 214 may be set and tuned depending on the formulated rules, and boundaries or limits observed based on some early training. Some examples of the hyperparameters that may be set and observed in early learning and may be tuned accordingly, may include a number of layers, layers dimensions, learning rate, and dropout regularization, and others regularization rates. The machine learning model 214 may be a learned model generated as output in the training process, and thus, over a period of time, the machine learning model 214 is able to predict the specific initial access information most suited for a given set of input features. Alternatively, in another implementation a convolutional neural network (CNN) may be used for deep learning, where the input features of the sensing information 208 and their relationship with the desired output values may be derived automatically.

Thus, at the end of the training phase, the connectivity enhanced database 216 is generated that specifies the plurality of time-of-day specific uplink and downlink beam alignment-wireless connectivity relationships for the surrounding area of each of the plurality of edge devices 104 independent of the plurality of different WCNs 110. Thereafter, the processor 202 may be further configured to distribute a different subset of information from the connectivity enhanced database 216 to each of the plurality of edge devices 104 according to a corresponding position of the each of the plurality of edge devices 104. The different subset of information may cause each of the plurality of edge devices 104 to service one or more UEs 106 in a motion state or in a stationary state in its surrounding area independent of the plurality of different WCNs 110 and bypassing an initial access-search on the corresponding edge device, such as the first edge device 104A. In the inference phase or the operational phase, whenever one or more UEs arrive in a later stage, instead of conducting an initial access-search on an edge device, the central cloud server 102 assists the edge device by providing them with optimized initial access information (e.g., best beam index, best beam configuration, best ARFCN, and PCID) that it has learned the machine learning model 214 during the training phase. Moreover, as the different subset of information from the connectivity enhanced database 216 is distributed in advance to each of the plurality of edge devices 104 according to the corresponding position of the each of the plurality of edge devices 104, each of the edge devices of the plurality of edge devices 104 themselves may be able to identify the optimized initial access information much faster than standard initial access procedure. Such subset of information is updated in real time or near time whenever there is a change in the surrounding environment that may potentially affect signal propagation from the corresponding edge devices of the plurality of edge devices 104.

In an example, in a city, there may be thousands of edge devices, where each edge device may only require enhanced information of its surrounding area to execute high performance communication, for example, in order to increase data throughput (e.g., in multi-gigabit data rate), optimize signal propagation paths in uplink and downlink communication, reduce latency, handle heterogeneity and multiple WCNs, and improve QoE. Thus, the processor 202 of the central cloud server 102 sends only a subset of information specific to the given edge device, such as the first edge device 104A, from the connectivity enhanced database 216. In an implementation, the subset of information specific to the given edge device includes time-of-day specific uplink and downlink beam alignment-wireless connectivity relationships only for a current surrounding area of the given edge device, such as the first edge device 104A, as per current position of the given edge device. In some implementation, the subset of information specific to the given edge device includes time-of-day specific uplink and downlink beam alignment-wireless connectivity relationships for a current surrounding area (N), a previous surrounding area (N−1) in vicinity, and a next surrounding area (N+1) of the given edge device, such as the first edge device 104A, as per current position of the given edge device. In other words, the subset of information specific to the given edge device includes optimized initial access information of at least three consequent geographical areas, where the middle geographical area may be the surrounding area of the given edge device. This further improves a switchover of a UE from one edge device (e.g. a deployed repeater device) to another edge device (e.g. another deployed repeater device) to maintain consistent connectivity, high data throughput, and low latency communication as the UE moves from one geographical area to another geographical area, where the switchover is controlled by the central cloud server 102.

In some implementations, some edge devices of the plurality of edge devices 104 may be UEs controlled by the central cloud server 102. In such a case, the different subset of information causes one or more edge devices of the plurality of edge devices 104 in a motion state or in a stationary state to attach to a corresponding base station bypassing the initial access-search on the corresponding edge device when the corresponding edge device itself is the UE controlled by the central cloud server 102.

In accordance with an embodiment, the processor 202 may be further configured to determine, based on position information of the first edge device 104A, whether a handover is required, and if so communicate wireless connectivity enhanced information including a specific initial access information to the first edge device 104A to bypass the initial access-search on the first edge device 104A. In a case where a wireless connection (e.g., a cellular connectivity) of a UE that is in motion, such as the first UE 106A, is about to become less than a threshold performance value, such performance drop may be predicted by the central cloud server 102 based on new sensing information received from one or more edge devices in the vicinity of the UE or from the UE itself. For example, the UE may be attached to the first base station 108A, and as the UE moves, the distance from the first base station 108A may increase, and the signal strength may gradually decrease. Thus, based on input features obtained from the new sensing information, such as a moving direction of the UE, a position of the UE, distance from one or more edge devices in the vicinity of the UE, a current weather condition, the location of the reflective objects around the UE, and an overall 3D environment representation around the UE, the processor 202 determines that a handover is required to maintain QoE, and accordingly selects a suitable edge device (e.g. the first edge device 104A) among the plurality of edge devices 104 and communicates wireless connectivity enhanced information to such selected edge device so that there is no need to perform beam sweeping operation or standard initial access search on such edge device. Thus, the UE may readily connect to the edge device, and continue to perform uplink and downlink communication with high throughput without any interruptions. Similarly, in accordance with an embodiment, the processor 202 may be further configured to determine that no handover is required for the first edge device 104A when a performance state of a wireless connection of the UE, such as the first UE 106A, is greater than a threshold performance value.

Alternatively, in an implementation, the processor 202 may be further configured to obtain processing chain parameters 212 from the plurality of edge devices 104. In an implementation, the processing chain parameters 212 may be additional parameters treated as learning labels (e.g., supervised learning labels or unsupervised output values) in addition to the beam alignment information. In another implementation, the processing chain parameters 212 may be received instead of the beam alignment information as the data obtained from processing chain parameters 212 may be a superset that includes the data points of the beam alignment information. In yet another implementation, for processing purposes, the processing chain parameters 212 may be treated and processed similar to that of the beam alignment information. The processing chain parameters 212 may be obtained for further exhaustive training and inference of the machine learning model 214.

The processing chain parameters 212 includes information associated with elements of one or more cascaded receiver chains and one or more cascaded transmitter chains of each edge device, radio blocks information, and modem information of the plurality of edge devices 104. The central cloud server 102 may be configured such that it has access to certain defined elements or all elements of one or more signal processing chain of each of the plurality of edge devices 104. For example, each of an uplink RF signal processing chain and a downlink RF signal processing chain may include a cascading receiver chain for signal reception, which includes elements, such as a set of low noise amplifiers (LNA), a set of receiver front end phase shifters, and a set of power combiners. Similarly, each of the uplink RF signal processing chain and the downlink RF signal processing chain may further include a cascading transmitter chain for baseband signal processing or digital signal processing for signal transmission, which includes elements such as a set of power dividers, a set of phase shifters, a set of power amplifiers (PA). There may be other elements and circuits like mixers, phase locked loops (PLL), frequency up-converters, frequency down-converters, a filter bank that may include one or more filters, such as filters for channel selection or other digital filters for noise cancellation or reduction. The central cloud server 102 may be configured to securely access, monitor, and configure the information associated with such elements of one or more cascaded receiver chains and one or more cascaded transmitter chains of each edge device to optimize each radio blocks and overall radio frequency signals, such as 5G signals.

In a first example, the central cloud server 102 may remotely access elements of the one or more signal processing chains, like the set of phase shifters, and utilize that, for example, to train the machine learning model 214, and optimize every block of a RF signal including phase (e.g. can control the phase shifting) etc. In a second example, the central cloud server 102 may remotely access information associated with elements, such as a set of LNAs to train the machine learning model 214, and utilize that information, for example, to learn and control amplification of input RF signals received by an antenna array, such as the one or more first antenna arrays 314 or the one or more second antenna arrays 316, in order to amplify input RF signals, which may have low-power, without significantly degrading corresponding signal-to-noise (SNR) ratio in the inference phase. In a third example, the central cloud server 102 may remotely access information (e.g., phase values of the input RF signals) associated with elements, such as set of phase shifters, to train the machine learning model 214, and control adjustment in phase values of the input RF signals, till combined signal strength value of the received input RF signals, is maximized to design beams in the inference phase. In a fourth example, the central cloud server 102 may be configured to train the machine learning model 214 with parameters (e.g., amplifier gains, and phase responses) associated with the one or more first antenna arrays 314 or the one or more second antenna arrays 316, and later use learnings in the inference phase to send control signals to remotely configure or control such parameters. In a fifth example, the central cloud server 102 may be configured to access beamforming coefficients from elements of the one or more signal processing chains to train the machine learning model 214 and use such learnings to configure, and control and adjust beam patterns to and from each of the plurality of edge devices 104. In a sixth example, since the central cloud server 102 has information associated with elements of one or more cascaded receiver chains and one or more cascaded transmitter chains of each edge device, the central cloud server 102 may configure dynamic partitioning of a plurality of antenna elements of an antenna array into a plurality of spatially separated antenna sub-arrays to generate multiple beams in different directions at the same time or in a different time slot. In a seventh example, since the central cloud server 102 has information associated with elements of one or more cascaded receiver chains and one or more cascaded transmitter chains of each edge device, the central cloud server 102 may configure and instruct an edge device for a suitable adjustment of a power back-off to minimize (i.e. substantially reduce) the impact of interference (echo or noise signals) and hence only use as much power as needed to achieve low error communication with one or more base stations in the uplink or the one or more UEs 106 in the downlink communication. In accordance with an embodiment, the central cloud server 102 may be further configured to configure, monitor, and provide management, monitoring and configuration services to, various layers of each of the plurality of edge devices 104 to optimize blocks of radio and perform Radio access network optimization to improve coverage, capacity and service quality.

It is known and specified in 3GPP that a radio frame of a 5G NR frame structure may include ten sub-frames, where each sub-frame, includes one or more slots based on different configurations. In an example, a sub-frame may include one slot, where each slot may include 14 symbols (e.g. 14 OFDM symbols). In a case where a sub-frame has two slots, then the radio frame has 20 slots. Similarly, in case where the sub-frame has four slots, then the radio frame has 40 slots, where the number of OFDM symbols within a slot is 14. It is also known that NR Time division duplexing (TDD) uses flexible slot configuration, where the flexible symbol can be configured either for uplink or for downlink transmissions.

In an implementation, the central cloud server 102 may obtain radio block information and may access decoded control information from each of the plurality of edge devices 104. The decoded control information may include (or indicates) a periodicity and a downlink/uplink cycle ratio, a time division duplex (TDD) pattern, a NR TDD slot format, or a plurality of NR TDD slot formats in a sequence. In accordance with an embodiment, the central cloud server 102 may obtain a physical cell identifier (PCID), an absolute radio-frequency channel number (ARFCN), and other properties of the plurality of base station of the plurality of different WCNs 110 through the network (e.g. 4G LTE, 5G NR, Internet, or any other wireless communication network). The central cloud server 102 may further receive a channel quality indicator and other channel estimates as a feedback from the plurality of edge devices 104.

In accordance with an embodiment, by virtue of the obtained modem information from the plurality of edge devices 104, the central cloud server 102 may have information of more than one device modem, and thus have holistic information (e.g. an operating behavior) of different modems of many edge devices in a geographical area, which can be used to train the machine learning model 214 and optimize the radio communication (e.g. signal propagation) holistically for the entire geographical area. In an implementation, a software application for each modem of an edge device may run on the central cloud server 102 rather in the modem of an edge device, such as a repeater device. For example, one virtual machine (VM) may be dedicated for one modem of an edge device. As the central cloud server 102 has information of more than one device modem, it will know about other modems of other edge devices in a given geographical area, and thus being a high computational resource capable device have capability to optimize radio signal propagation and channel characteristic of the given geographical area, thereby improving network performance of the plurality of different WCNs 110, and providing high performance wireless communication for the given geographical area (and similarly other geographical areas) to improve QoE.

In accordance with an embodiment, the central cloud server 102 may be further configured to access a Serial Peripheral Interface (SPI) between a modem and the radio (e.g., the front-end RF section 306) of each of the plurality of edge devices 104. The SPI may be a full-duplex bus interface used to send data between the control section 304 (e.g., a microcontroller or DSP) and other peripheral components, such as the modem, for example, a 5G modem, and sensing radar (when present) in an edge device. The SPI interface supports very high speeds, and throughput, and is suitable for handing a lot of data. In an example, the processing chain parameters 212 may be accesses using access to the SPI.

In an implementation, the processor 202 may be further configured to extract and tag parameters of the processing chain parameters 212 as learning labels. The obtained sensing information 208 may be considered as input features, whereas the processing chain parameters 212 may be considered as learning labels for the correlation. The processor 202 may be further configured to execute a mapping of the learning labels with one or more features of the obtained sensing information 208 until the plurality of time-of-day specific uplink and downlink beam alignment-wireless connectivity relationships is established and further updated for the surrounding area of each of the plurality of edge devices 104.

Similar to the correlation of the obtained sensing information 208 and the beam alignment information 210, the processor 202 may be further configured to correlate the processing chain parameters 212 with that of the obtained sensing information 208 and the beam alignment information 210 for different times-of-day such that the connectivity enhanced database 216 is updated and includes further learned information at holistic level for a plurality of different geographical areas associated with the plurality of different WCNs 110. The correlation further improves QoE and indicates that for a given set of input features extracted from the sensing information 208, insights are provided as to what were the processing chain parameters 212 when there was most suitable (i.e., best) initial access information for a given edge device to service one or more UEs in its surrounding area, and hence it allows optimal management of network resources including the plurality of edge devices 104 in the inference phase.

In an example, the central cloud server 102 by use of the connectivity enhanced database 216 and the machine learning model 214, and based on the distribution of the different subset of information from the connectivity enhanced database 216 to each of the plurality of edge devices 104 according to a corresponding position of the each of the plurality of edge devices 104, further achieves the following:

(a) reduce time to align to a timing offset of a beam reception at an edge device to a frame structure of a 5G NR radio frame, and allows uplink and downlink to use complete 5G NR frequency spectrum, but in different time slots, where some short time slots are designated for uplink while other time slots are designated for downlink;

(b) perform coordination among the edge devices of the plurality of edge devices 104 for beam forming optimizations for enhanced network coverage and quality of service (QOS);

(c) remotely control the phase shifting by controlling the adjustment in phase values of the input RF signals, till combined signal strength value of the received input RF signals, is maximized to design beams in the inference phase;

(d) control amplification of input RF signals, which may have low-power, without significantly degrading corresponding signal-to-noise (SNR) ratio in the inference phase;

(e) send control signals to remotely configure or control parameters (e.g., amplifier gains, and phase responses) associated with the one or more first antenna arrays 314 or the one or more second antenna arrays 316;

(f) configure and control and adjust beam patterns to and from each of the plurality of edge devices 104;

(g) remotely configure dynamic partitioning of a plurality of antenna elements of an antenna array into a plurality of spatially separated antenna sub-arrays to generate multiple beams in different directions at the same time or in different time slots;

(h) configure and instruct an edge device for a suitable adjustment of a power back-off to minimize (i.e., substantially reduce) the impact of interference (echo or noise signals) and hence only use as much power as needed to achieve low error communication with one or more base stations in the uplink or the one or more UEs 106 in the downlink communication; and (i) optimize blocks of radio and perform Radio access network optimization to improve coverage, capacity and service quality of different geographical areas.

Figure 3:
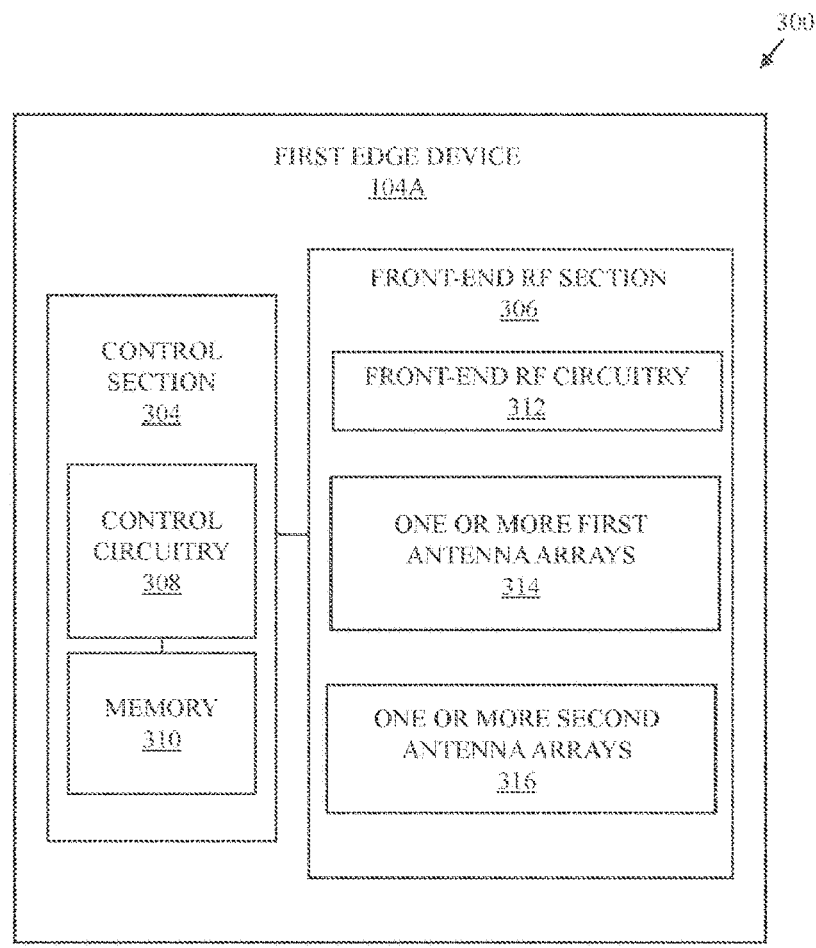
FIG. 3 is a block diagram illustrating different components of an exemplary edge device, in accordance with an embodiment of the disclosure.

FIG. 3 is a block diagram illustrating different components of an exemplary edge device, in accordance with an embodiment of the disclosure. FIG. 3 is explained in conjunction with elements from FIGS. 1 and 2. With reference to FIG. 3, there is shown a block diagram 300 of the first edge device 104A. The first edge device 104A may include a control section 304 and a front-end radio frequency (RF) section 306. The control section 304 may include a control circuitry 308 and a memory 310. The control section 304 may be communicatively coupled to the front-end RF section 306. The front-end RF section 306 may include front-end RF circuitry 312 and a plurality of antenna arrays, such as one or more first antenna arrays 314 and one or more second antenna arrays 316.

The first edge device 104A includes suitable logic, circuitry, and interfaces that may be configured to communicate with one or more network nodes, such as one or more base stations of the plurality of base stations 108, another edge device of the plurality of edge devices 104, and user equipment (UEs). In accordance with an embodiment, the first edge device 104A may support multiple and a wide range of frequency spectrum, for example, 2G, 3G, 4G, 5G, and 6G (including out-of-band frequencies). The first edge device 104A is one of an XG-enabled edge repeater device, an XG-enabled relay device, an XG-enabled small-cell, or an XG-enabled user equipment (UE) controlled by the central cloud server 102, where the term "XG" refers to 5G or 6G. Other examples of the first edge device 104A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof.

The control circuitry 308 may be communicatively coupled to the memory 310 and the front-end RF section 306 including the front-end RF circuitry 312, the one or more first antenna arrays 314, and the one or more second antenna arrays 316. The control circuitry 308 may be configured to execute various operations of the first edge device 104A. The control circuitry 308 may be configured to control various components of the front-end RF section 306. The first edge device 104A may be a programmable device, where the control circuitry 308 may execute instructions stored in the memory 310. Examples of the implementation of the control circuitry 308 may include, but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The memory 310 may be configured to store the subset of information obtained from the central cloud server 102, where the subset of information specifies a plurality of time-of-day specific uplink and downlink beam alignment-wireless connectivity relationships for a surrounding area specific to the first edge device 104A. Examples of the implementation of the memory 310 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 304 may further include one or more other components, such as an analog to digital converter (ADC), a digital to analog (DAC) converter, a cellular modem, and the like, known in the art, which are omitted for brevity.

The front-end RF circuitry 312 includes receiver circuitry and transmitter circuitry. The receiver circuitry is coupled to the one or more receiving antenna arrays, such as one of the one or more first antenna arrays 114 or the one or more second antenna arrays 116, or may be a part of the receiver chain. The transmitter circuitry may be coupled to the one or more transmitting antenna arrays, such as the one of the one or more first antenna arrays 114 or the one or more second antenna arrays 116 in an implementation. The front-end RF circuitry 312 supports millimeter wave (mmWave) communication as well communication at a sub 6 gigahertz (GHz) frequency.

Each of the one or more first antenna arrays 114 and the one or more second antenna arrays 116 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but is not limited to, a linear phased array antenna, a planar phased array antenna, a frequency scanning phased array antenna, a dynamic phased array antenna, and a passive phased array antenna.

In operation, in accordance with an embodiment, the control circuitry 308 may be configured to capture sensing information of a surrounding of the first edge device 104A. The control circuitry 308 may be configured to periodically sense its surroundings and communicate the sensed information, such as the sensing information 208, to the central cloud server 102. Based on where the first edge device 104A is deployed, for example, whether deployed at a fixed location or as a portable device, for example, mounted on a vehicle or as a portable repeater device, the first edge device 104A may use its own sensing mechanism, such as a sensing radar, to sense its surrounding environment, utilize external sensing devices, or utilize a combination of both. In an implementation, when deployed at the fixed location, the control circuitry 308 may utilize the sensing radar and one or more image-capture devices to map its surrounding three-dimensional (3D) environment to generate a 3D environmental representation. The 3D environmental representation may indicate movable and immobile physical structures in the surrounding area of the first edge devices 104A. In some implementations, when deployed at a vehicle, the first edge device 104A may be configured to utilize external sensing devices, such as Lidar, camera, accelerometer, GNSS, gyroscope, or IoT devices (e.g. video surveillance devices, roadside sensor systems for measuring speed, local road conditions, local traffic, and the like) located within its communication range to acquire sensing information 208 from such external devices. Other examples of the sensing information 208 may include, but not limited to, a 2D position of the first edge device 104A, a 3D position (including elevation if deployed at a fixed location like a pole), a location of the one or more UEs 106 in the motion state or in the stationary state in the surrounding area, a moving direction of different UEs, a time-of-day, traffic information, road information, construction information, traffic light information, nearby bridges, location of reflective objects in the surrounding area, weather information, a distance of the first edge device 104A from one or more UEs 106 within its range, distance of the first edge device 104A from its surrounding objects, such as other vehicles, buildings, or edges of a building, distance of one or more serving base stations of the plurality of base stations 108, trees, and other immobile physical structures (such as reflective objects) or other mobile objects, or any change detected in the surrounding area of the first edge device 104A. The control circuitry 308 may be further configured to periodically communicate sensing information 208 to the central cloud server 102.

The control circuitry 308 may be further configured to periodically communicate beam alignment information 210 to the central cloud server 102. The beam alignment information 210 may comprise one or more of a transmit (Tx) beam information associated with the first edge device 104A, a receive (Rx) beam information associated with the first edge device 104A, a Physical Cell Identity (PCID) currently used by the first edge device 104A, an absolute radio-frequency channel number (ARFCN) used by the first edge device 104A, and a signal strength information associated with each of Tx beam and the Rx beam of the first edge device 104A. All such measurements and feedback are sent to the central cloud server 102 for learning.

In accordance with an embodiment, the sensing information 208 and the beam alignment information 210 obtained by the central cloud server 102 from the edge device and other edge devices of a plurality of edge devices 104 is correlated by the central cloud server 102 for different times-of-day such that a connectivity enhanced database 216 is generated that specifies a plurality of time-of-day specific uplink and downlink beam alignment-wireless connectivity relationships for a surrounding area of each of the plurality of edge devices 104 independent of a plurality of different WCNs 110.

The control circuitry 308 may be configured to obtain a subset of information from the central cloud server 102 according to a position of the first edge device 104A, where the subset of information specifies a plurality of time-of-day specific uplink and downlink beam alignment-wireless connectivity relationships for a surrounding area specific to the first edge device 104A. The control circuitry 308 may be further configured to receive a corresponding connection request from one or more UEs 106. The connection request may be received via an out-of-band communication, such as Wi-Fi™, BLUETOOTH™, Li-Fi, a sidelink request (e.g., LTE sidelink, 5G New Radio (NR) sidelink, NR C-V2X sidelink), a vehicle-to-infrastructure (V2I) request, a personal area network (PAN) connection, or other out-of-band connection requests. The control circuitry 308 may be further configured to identity the one or more UEs 106 based on the connection request. Based on the obtained subset of information and the corresponding connection request, the control circuitry 308 may be further configured to service one or UEs 106 in the surrounding area bypassing an initial access-search on the first edge device 104A. The first edge device 104A is independent of a plurality of different WCNs 110 such that any one of the plurality of different WCNs 110 is used to service a specific UE in accordance with an association of the specific UE to a specific wireless carrier network. Thus, a consumer, such as the first UE 106A, has is provided with the capability to choose which WCN (i.e. which service provider) they like to connect to, and this is enabled from the cloud, such as the central cloud server 102. The central cloud server 102 transmits a specific initial access information (optimal initial access information) associated with a WCN, such as the first WCN 110A, to the first edge device 104A, where such specific initial access information is used by the first edge device 104A to establish wireless connectivity by passing conventional initial-access search. Hence, beneficially, a consumer of a UE, such as the first UE 106A, subscribed to the first WCN 110A can request the first edge device 104A in the connection request to relay an RF signal of the first WCN 110A, and if the consumer of the first UE 106A is subscribed to the second WCN 110B, then the first UE 106A can request the first edge device 104A, to relay an RF signal of the second WCN 110B. Additionally, and advantageously, as the plurality of time-of-day specific uplink and downlink beam alignment-wireless connectivity relationships for the surrounding area of the first edge device 104A is independent of the plurality of different WCNs 110, the complexity and the initial access latency is significantly reduced as the standard beam sweeping operation in the initial access phase is bypassed and is not required to be performed at the one or more UEs 106 and the first edge device 104A which in turn improves network performance and reduces additional signaling load (due to standard initial-access search) on associated WCNs of the plurality of different WCNs 110.

In yet another aspect of the disclosure, one or more of the plurality of edge devices may be UEs controlled by the central cloud server 102. Thus, due to the awareness of a physical location of a given edge device (in this case, a UE), the edge device may be configured to obtain the wireless connectivity enhanced information that includes a specific initial access information for the given edge device (i.e. a UE) to bypass initial access search at the given edge device (i.e. the UE), and further may be connected (i.e., attached) to a base station (e.g., a gNB) directly (or via a nearby small cell or CPE) specified in the obtained specific initial access information from the central cloud server 102 with reduced latency as compared to standard gNB handover time. Thus, arbitrated between the central cloud server 102 and the given edge device (i.e. the UE), alleviates other network nodes (such as a CPE, or a small cell present in the vicinity of the UE) from these complex functions, thereby simplifying their beam forming design and consequently lower cost of infrastructure.

In some scenarios, one or more of the plurality of edge devices may be CPEs. In such a case, a given edge device, such as the second edge device 104B, may be configured to obtain the wireless connectivity enhanced information that includes a specific initial access information for given edge device (in this scenario, a CPE), where the specific initial access information may specify to connect to a nearby small cell to service a UE for high performance communication. Thus, arbitrated between the central cloud server 102 and the given edge device (due to the cloud awareness of the physical location of the UE as well as the CPE), alleviates the CPE from these complex functions, for example, location tracking of the UE, thereby simplifying its beam forming design and consequently lowering cost.

Figure 4A:
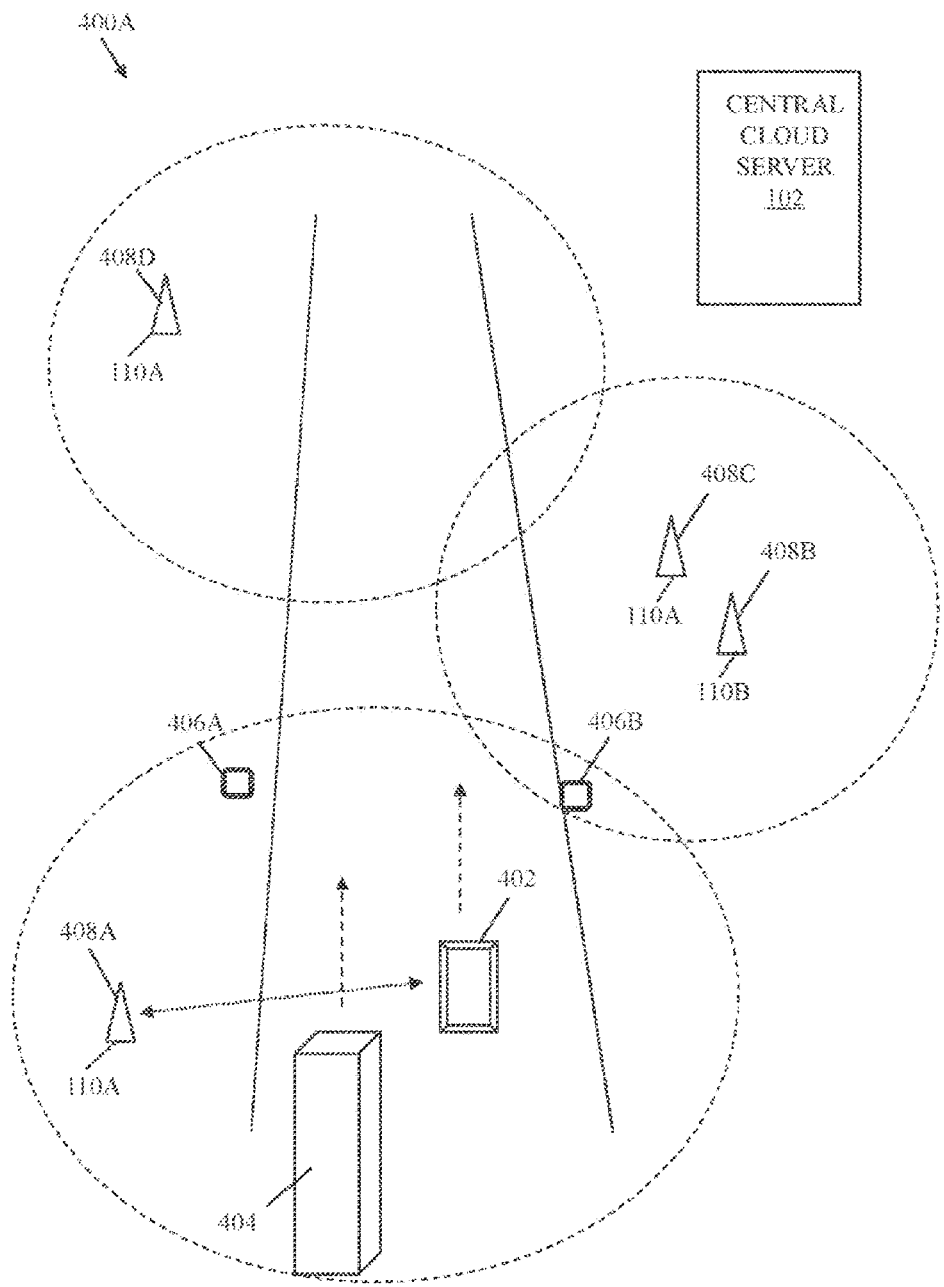
FIGS. 4A, 4B, and 4C illustrate exemplary scenarios for implementation of the communication system and method for central cloud server and edge devices assisted high speed low-latency wireless connectivity, in accordance with an embodiment of the disclosure.
Figure 4B:
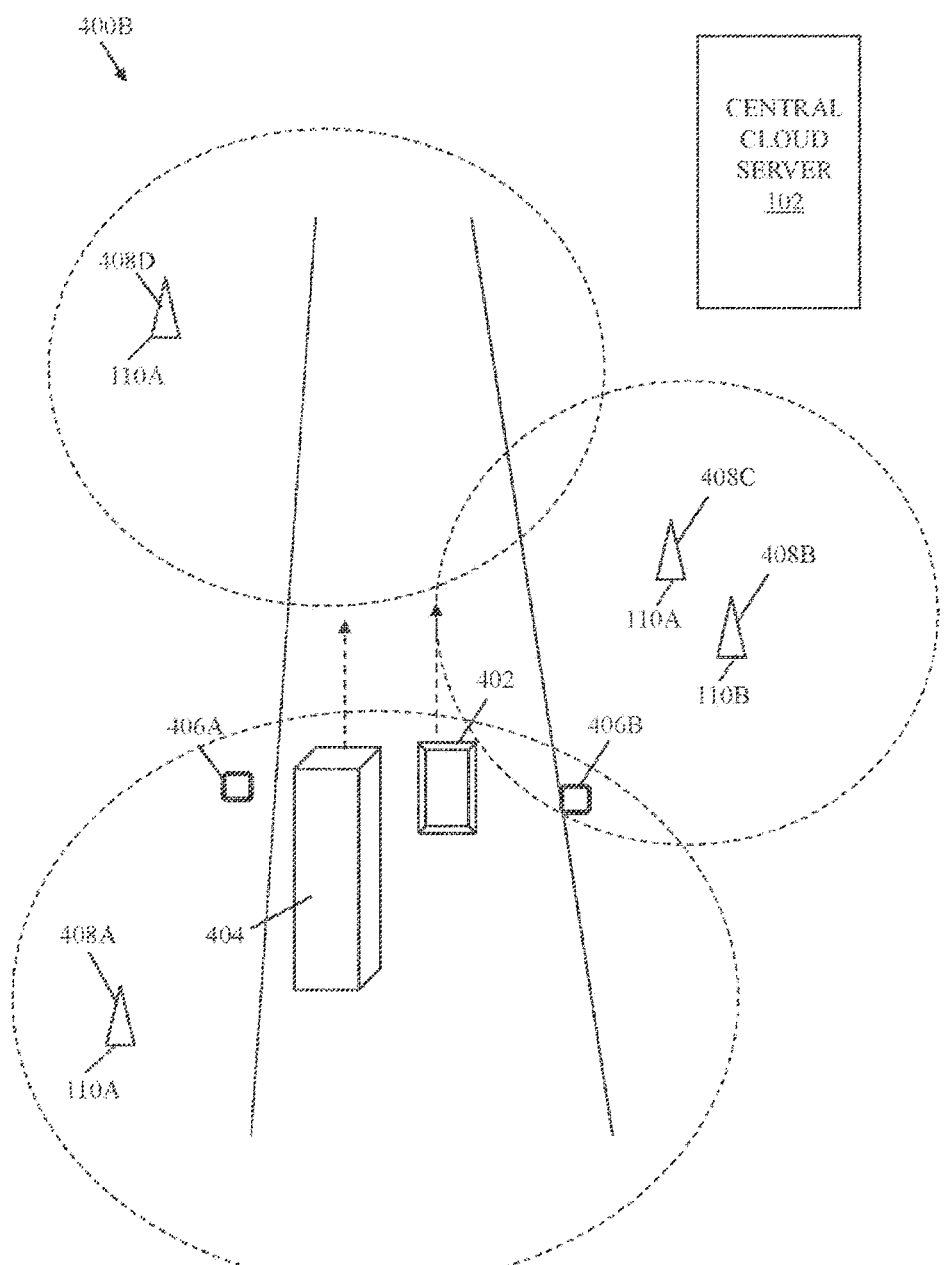
Figure 4C:
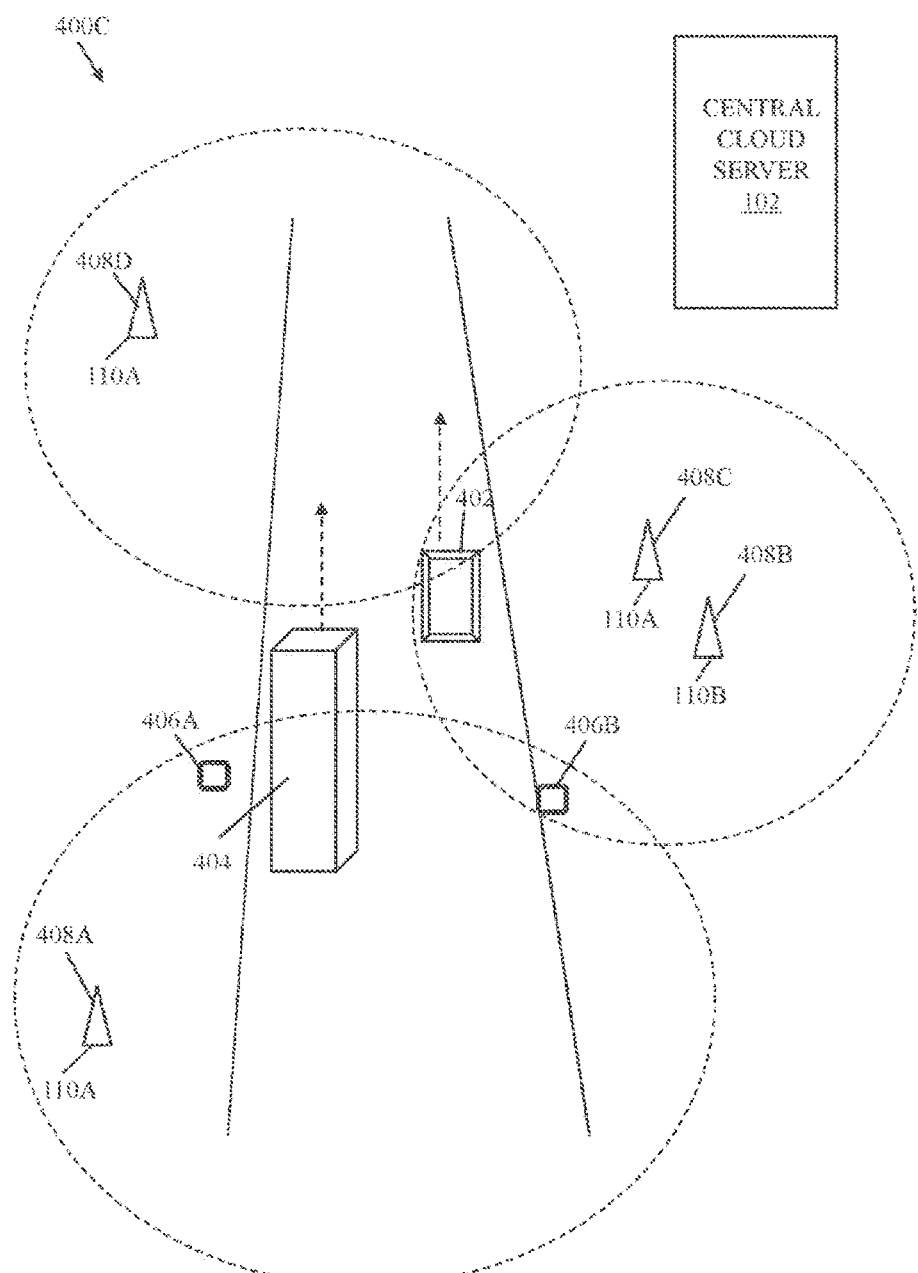

FIGS. 4A, 4B, and 4C illustrate exemplary scenarios for implementation of the communication system and method for central cloud server and edge devices assisted high speed low-latency wireless connectivity, in accordance with an embodiment of the disclosure. FIGS. 4A, 4B, and 4C are explained in conjunction with elements from FIGS. 1, 2, and 3. With reference to FIGS. 4A, 4B, and 4C, there is shown a first vehicle 402, a second vehicle 404, a plurality of repeater devices, such as repeater devices 406A and 406B, and a plurality of base stations, such as gNBs 408A, 408B, 408C, and 408D, and the central cloud server 102 (FIGS. 1 and 2). The gNBs 408A, 408C, and 408D may be of the first WCN 110A of a first service provider and the gNBs 408B may be of the second WCN 110B of a second service provider. In a first implementation, the first vehicle 402 may correspond to a 5G-enabled UE controlled by the central cloud server 102. In an example, the first vehicle 402 may have an application installed in it (e.g. installed in an in-vehicle infotainment system) which is communicatively coupled to the central cloud server 102 to receive its services. Alternatively, in a second implementation, the first vehicle 402 may include a UE, for example, a smartphone or an in-vehicle device, which has the application installed in it, and which is communicatively coupled to the central cloud server 102 to receive its services. For the sake of brevity, some exemplary functions of the central cloud server 102 and the method for central cloud server 102 and edge devices assisted high speed low-latency wireless connectivity, is described by taking an example of the first implementation. However, it is to be understood that functions described for the first vehicle 402 are also applicable for the second implementation, i.e., functions of the UE within a vehicle, such as the first vehicle 402, without limiting the scope of the disclosure.

With reference to FIG. 4A, there is shown a first exemplary scenario 400A, in which the first vehicle 402 and the second vehicle 404 are in motion. In this case, the first vehicle 402 may be a semi-autonomous or an autonomous vehicle. The first vehicle 402 may be attached to the gNB 408A of the first WCN 110A while in motion. In some implementations, the first vehicle 402 may be configured to communicate sensing information in real time or near real time to the central cloud server 102. In some implementations, the first vehicle 402 may be configured to communicate sensing information to a first inference server that may be deployed nearest to the current location of the first vehicle 402. There may be several inference servers deployed at different locations serving different geographical areas, which may be communicatively coupled to the central cloud server 102. The decision to whether to communicate the sensing information directly to the central cloud server 102 or to the nearest deployed inference server may be based on a configured setting on the application and/or based on an amount or a type of data that is to be communicated. This further provides a hybrid computing capability based on a user preference (e.g., as opt-in or opt-out features provided to premium users) to the communication system including the central cloud server 102 and the method of the present disclosure. The second vehicle may also be attached to the gNB 408A. In the first exemplary scenario 400A, the central cloud server 102 (or the first inference server based on the subset of information communicated previously by the central cloud server 102) may be configured to obtain the sensing information and extract features from the sensing information and determine that no handover is required for the first vehicle 402 in a real time or a near time. As a result of the machine learning model 214 and the connectivity enhanced database 216 of the central cloud server 102, it is immediately ascertained that for the extracted features (e.g., a time-of day, a current position of the first vehicle 402, a distance of the first vehicle 402 from the gNB 408A, a distance of the first vehicle 402 from the repeater devices 406A and 406B, a current 3D environment representation that indicates any possibility of signal blockages or fading, road condition, traffic information, and a current weather condition), the performance state of a wireless connection of the first vehicle 402 is greater than a threshold performance value, and there is no need for any handover. There is no need to do any signal measurements at this point because of the low-latency connectivity enhanced database 216, which can holistically handle multi-dimensional input features.

With reference to FIG. 4B, there is shown a second exemplary scenario 400B in continuation to the first exemplary scenario 400A. In the second exemplary scenario 400B, the first vehicle 402 and the second vehicle 404 further move ahead, as shown. The first vehicle 402 may further send sensing information to the central cloud server 102 (or the first inference server based on a selected setting on the installed application). However, in this case, the central cloud server 102 (or the first inference server) may be further configured to determine that a handover is required for the first vehicle 402, based on the recently received sensing information, which indicates that some mobile object (i.e., the second vehicle 404) may be blocking a 5G signal from the gNB 408A. Accordingly, the central cloud server 102 (or the first inference server) selects an appropriate repeater device, i.e., the repeater device 406B, to communicate wireless connectivity enhanced information including a specific initial access information to the repeater device 406B to bypass the initial access-search on the repeater device 406B and the first vehicle 402. In this case, the repeater device 406B may be attached to the gNB 408B of the second WCN 110B initially, but quickly switches over to the gNB 408C of the first WCN 110A based on the specific initial access information (e.g. a given donor beam index, PCID of gNB 408C, and related ARFCN) received from the central cloud server 102. Thus, the repeater device 406B may be independent of the plurality of different WCNs 110, such as the first WCN 110A and the second WCN 110B. The specific initial access information may further indicate to select a particular service side beam index, e.g., a beam index #19 out of 0-63 and a particular beam configuration based on time-of-day and other sensing information, to service the first vehicle 402 bypassing the initial access search at the repeater device 406B as well as the first vehicle 402, where the handover time is much lesser than the standard average mm-wave gNB handover time under same scenarios, such as same cell radius and vehicle travelling speed.

With reference to FIG. 4C, there is shown a third exemplary scenario 400C in continuation to the second exemplary scenario 400B. In the third exemplary scenario 400C, the first vehicle 402 and the second vehicle 404 further move ahead, where first vehicle 402 is about to move beyond a coverage area of the gNB 408C. The first vehicle 402 (i.e., a 5G-enabled UE controlled by the central cloud server 102) may further send updated sensing information to the central cloud server 102 (or the first inference server). Based on the updated sensing information, the central cloud server 102 (or the first inference server) may predict that will be no deployed repeater devices or other network nodes (such as a small cell, an RSU, etc.) that may be in a communication range of the first vehicle 402 in the travel path based on a moving direction and speed of the first vehicle 402 and that a handover to a new gNB, such as the gNB 408D of the first WCN 110A, will need to be executed by the first vehicle 402 as the first vehicle 402 moves beyond the coverage area of the gNB 408C. Thus, the central cloud server 102 (or the first inference server) may be further configured to communicate a wireless connectivity enhanced information including a new specific initial access information to the first vehicle 402 to bypass the initial access-search on the first vehicle 402 and quickly attach to the gNB 408D, say less than one or two seconds. The second vehicle 404, may be a conventional vehicle, and may not be a known user to the central cloud server 102 (or may not be communicatively coupled to the central cloud server 102 to receive its services), and thus may need to perform standard initial-access search to attach to the gNB 408D, which may take a standard time (e.g. the average mmWave gNB handover time is on the order of 10-20 sec, assuming ~500 m cell radius (i.e. coverage area) and travelling speed of 50 MPH). For example, the second vehicle 404 may need to perform following four beam management operations: a) Beam sweeping, where an exhaustive scanning of a spatial area with a set of beams transmitted and received needs to done; b) Beam measurement, where signal quality, such as received power (RSRP), Signal to Interference plus Noise Ratio (SINR), of the received beam of RF signals, may need to be executed; c) Beam determination, where an optimal beam (or set of beams) may be selected for establishing directional communications; and d) Beam reporting, it is reported to network of the signal quality and on the decisions made in the previous phase. The first vehicle 402 by virtue of the obtained wireless connectivity enhanced information that includes optimal initial access information is able to bypass the initial access-search and reduce signaling overhead usually incurred by network processes by avoiding many of such standard beam management operations on the first vehicle 402 without any adverse impact while still maintaining QoE with high reliability and consistency.

Figure 5A:
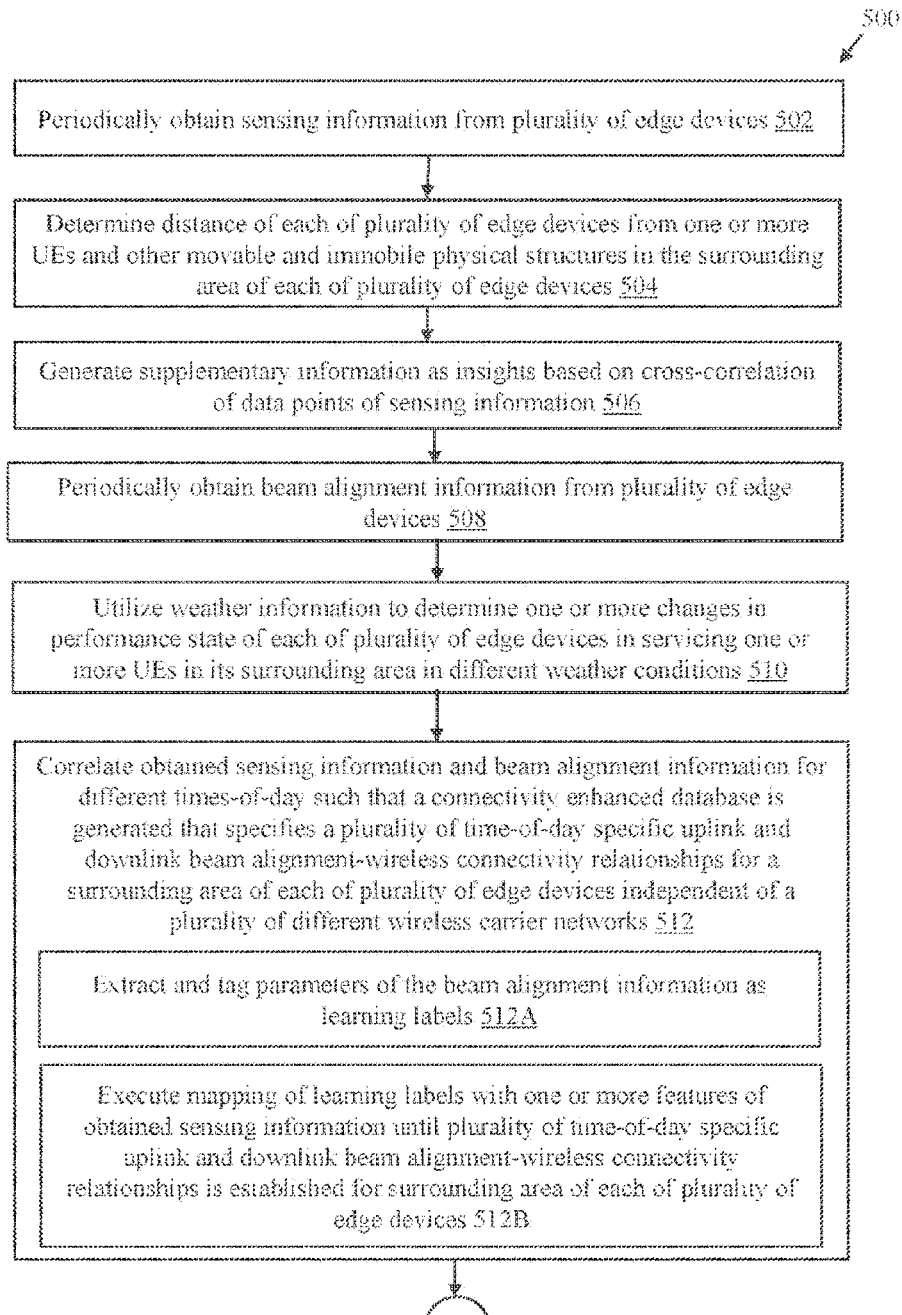
FIGS. 5A and 5B collectively is a flowchart that illustrates a method for a central cloud server and edge devices assisted high speed low-latency wireless connectivity for high performance communication, in accordance with an embodiment of the disclosure.
Figure 5B:
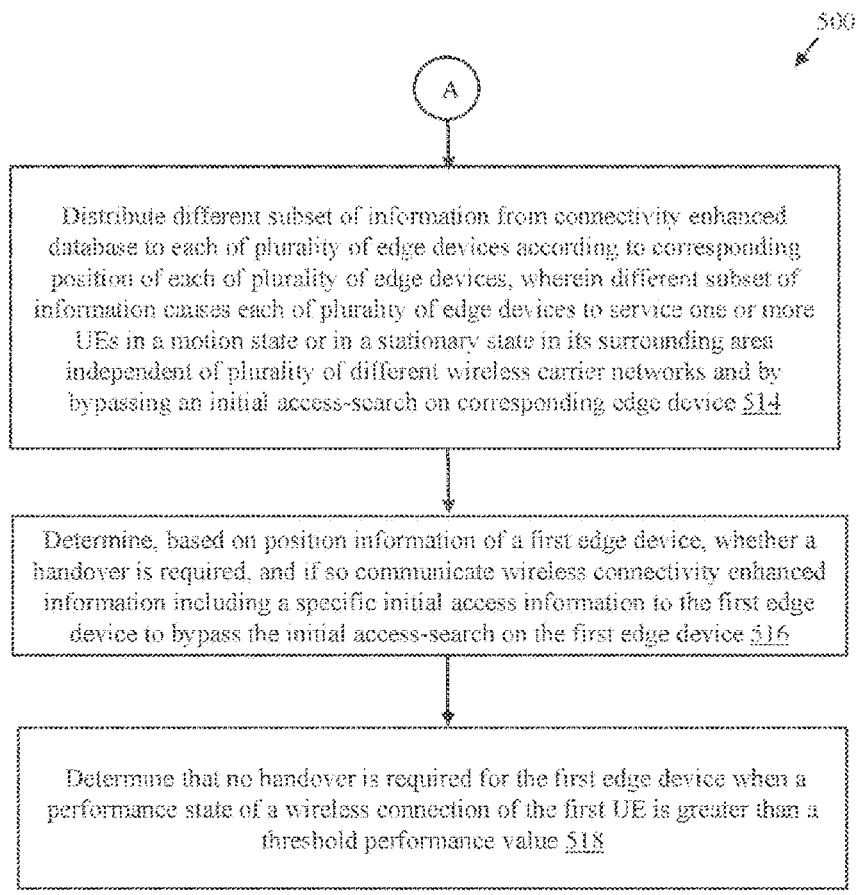

FIGS. 5A and 5B collectively is a flowchart that illustrates a method for a central cloud server and edge devices assisted high speed low-latency wireless connectivity for high performance communication, in accordance with an embodiment of the disclosure. FIGS. 5A and 5B are explained in conjunction with elements from FIGS. 1, 2, 3, 4A and 4B. With reference to FIGS. 5A and 5B, there is shown a flowchart 500 comprising exemplary operations 502 through 518. The operations of the method depicted in the flowchart 500 may be implemented in the central cloud server 102 (FIG. 1).

At 502, sensing information 208 may be periodically obtained from the plurality of edge devices 104. The processor 202 may be configured to periodically obtain sensing information 208 from the plurality of edge devices 104. The sensing information 208 may comprise a position of each of the plurality of edge devices 104, a location of the one or more UEs 106 in the motion state or in the stationary state in the surrounding area of each of the plurality of edge devices 104, a moving direction of the one or more UEs 106, a time-of-day, traffic information, road information, construction information, traffic light information, and weather information.

At 504, a distance of each of the plurality of edge devices 104 from one or more UEs 106 and other movable and immobile physical structures in the surrounding area of each of the plurality of edge devices 104 may be determined. The processor 202 may be further configured to determine such distance.

At 506, supplementary information may be generated as insights based on cross-correlation of data points of the sensing information 208. The processor 202 may be further configured to generate the supplementary information as insights based on cross-correlation of data points of the sensing information 208.

At 508, beam alignment information 210 may be periodically obtained from the plurality of edge devices 104. The processor 202 may be further configured to periodically obtain beam alignment information 210 from the plurality of edge devices 104. The beam alignment information 210 received by the central cloud server 102 from the plurality of edge devices 104 during a training phase may comprise one or more of a transmit (Tx) beam information, a receive (Rx) beam information, a Physical Cell Identity (PCID), and an absolute radio-frequency channel number (ARFCN), and a signal strength information associated with each of Tx beam and the Rx beam of the plurality of edge devices 104.

At 510, the weather information may be utilized to determine one or more changes in a performance state of each of the plurality of edge devices 104 in servicing the one or more UEs 106 in its surrounding area in different weather conditions. The processor 202 may be further configured to utilize the weather information to determine one or more changes in a performance state of each of the plurality of edge devices 104 in servicing the one or more UEs 106 in its surrounding area in different weather conditions.

At 512, the obtained sensing information 208 and the beam alignment information 210 may be correlated for different times-of-day such that a connectivity enhanced database 216 is generated that specifies a plurality of time-of-day specific uplink and downlink beam alignment-wireless connectivity relationships for a surrounding area of each of the plurality of edge devices 104 independent of the plurality of different WCNs 110. The processor 202 may be further configured to correlate the obtained sensing information 208 and the beam alignment information 210 for different times-of-day. In an implementation, the operation 512 may include sub-operations 512A and 512B.

At 512A, parameters of the beam alignment information 210 may be extracted and tagged as learning labels. The processor 202 may be further configured to extract and tag parameters of the beam alignment information 210 as learning labels.

At 512B, a mapping of the learning labels may be executed with one or more features of the obtained sensing information 208 until the plurality of time-of-day specific uplink and downlink beam alignment-wireless connectivity relationships is established for the surrounding area of each of the plurality of edge devices 104. The processor 202 may be further configured to execute the mapping of the learning labels with one or more features of the obtained sensing information 208 until the plurality of time-of-day specific uplink and downlink beam alignment-wireless connectivity relationships is established for the surrounding area of each of the plurality of edge devices 104.

At 514, a different subset of information may be distributed from the connectivity enhanced database 216 to each of the plurality of edge devices 104 according to a corresponding position of the each of the plurality of edge devices 104, where the different subset of information may cause each of the plurality of edge devices 104 to service one or more UEs 106 in a motion state or in a stationary state in its surrounding area independent of the plurality of different WCNs 110 bypassing an initial access-search on the corresponding edge device, such as the first edge device 104A. The processor 202 may be further configured to distribute the different subset of information from the connectivity enhanced database 216 to each of the plurality of edge devices 104 according to the corresponding position of the each of the plurality of edge devices 104.

At 516, it may be determined, based on position information of the first edge device 104A, whether a handover is required, and if so, communicate wireless connectivity enhanced information including a specific initial access information to the first edge device 104A to bypass the initial access-search on the first edge device 104A. The processor 202 may be further configured to determine, based on the position information of the first edge device 104A, whether the handover is required, and if so, communicate wireless connectivity enhanced information including the specific initial access information to the first edge device 104A to bypass the initial access-search on the first edge device 104A.

At 518, it may be determined that no handover is required for the first edge device 104A when a performance state of a wireless connection of the first UE 106A is greater than a threshold performance value. The processor 202 may be further configured to determine that no handover is required for the first edge device 104A.

Figure 6:
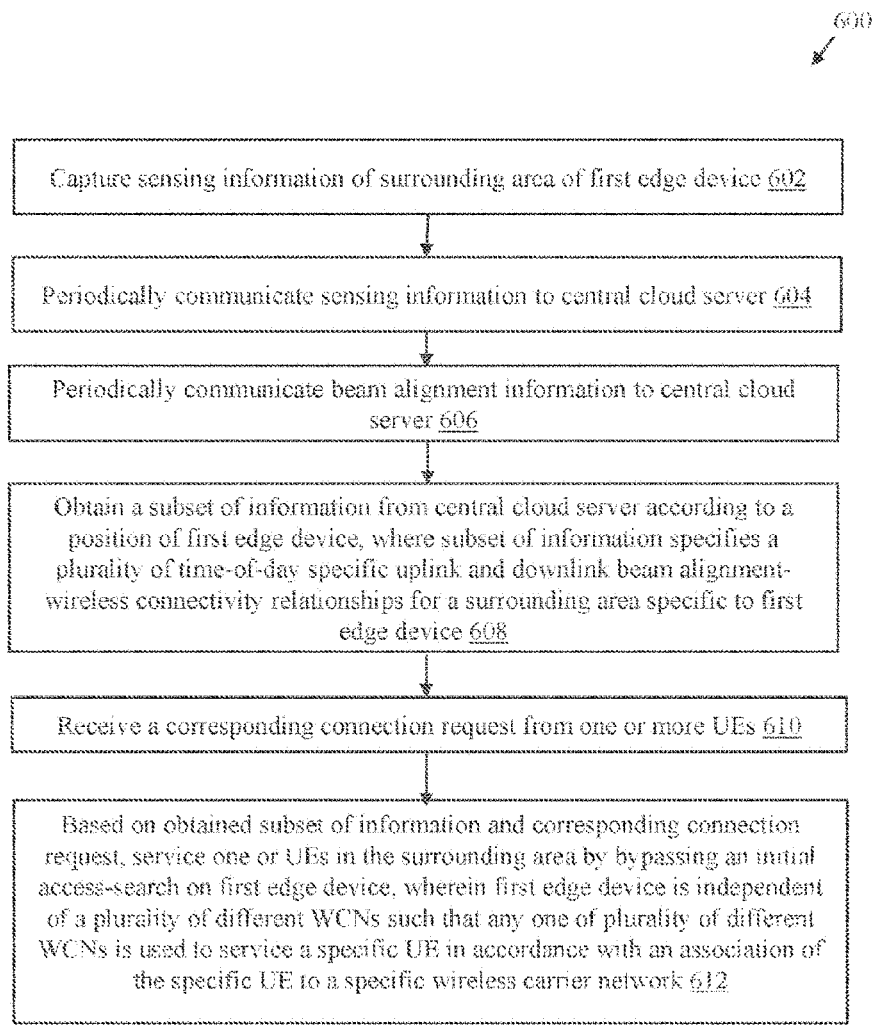
FIG. 6 is a flowchart that illustrates a method for a central cloud server and edge device assisted high speed low-latency wireless connectivity for high performance communication, in accordance with an embodiment of the disclosure.

FIG. 6 is a flowchart that illustrates a method for a central cloud server assisted high speed low-latency wireless connectivity for high performance communication, in accordance with an embodiment of the disclosure. FIGS. 6A and 6B are explained in conjunction with elements from FIGS. 1, 2, 3, 4A, and 4B. With reference to FIGS. 6A and 6B, there is shown a flowchart 600 comprising exemplary operations 602 through 612. The operations of the method depicted in the flowchart 600 may be implemented in an edge device, such as the first edge device 104A (FIG. 1).

At 602, sensing information of a surrounding area of the first edge device 104A may be captured. The sensing information captured by the first edge device 104A is described in details, for example, in FIG. 3. At 604, sensing information 208 may be periodically communicated to the central cloud server 102.

At 606, beam alignment information 210 may be periodically communicated to the central cloud server 102. In accordance with an embodiment, the sensing information 208 and the beam alignment information 210 obtained by the central cloud server 102 from the edge device and other edge devices of a plurality of edge devices 104 is correlated by the central cloud server 102 for different times-of-day such that a connectivity enhanced database 216 is generated that specifies a plurality of time-of-day specific uplink and downlink beam alignment-wireless connectivity relationships for a surrounding area of each of the plurality of edge devices 104 independent of a plurality of different WCNs 110.

At 608, a subset of information may be obtained from the central cloud server 102 according to a position of the first edge device 104A, where the subset of information specifies a plurality of time-of-day specific uplink and downlink beam alignment-wireless connectivity relationships for a surrounding area specific to the first edge device 104A.

At 610, a corresponding connection request may be received from one or more UEs 106. The connection request may be received via an out-of-band communication, such as Wi-Fi™, BLUETOOTH™, Li-Fi, a sidelink request (e.g. LTE sidelink, 5G New Radio (NR) sidelink, NR C-V2X sidelink), a vehicle-to-infrastructure (V2I) request, a personal area network (PAN) connection, or other out-of-band connection requests. The one or more UEs 106 may be identified as priority users based on the connection request in order to prioritize servicing the one or more UEs 106.

At 612, based on the obtained subset of information and the corresponding connection request, one or UEs 106 in the surrounding area may be serviced bypassing an initial access-search on the first edge device 104A, where the first edge device 104A is independent of a plurality of different WCNs 110 such that any one of the plurality of different WCNs 110 is used to service a specific UE in accordance with an association of the specific UE to a specific wireless carrier network.

Various embodiments of the disclosure may provide a non-transitory computer-readable medium having stored thereon, computer implemented instructions that when executed by a computer causes the computer to execute operations to periodically obtain sensing information from a plurality of edge devices 104 and periodically obtain beam alignment information from the plurality of edge devices 104. The operations also include correlating the obtained sensing information and the beam alignment information for different times-of-day such that a connectivity enhanced database 216 is generated that specifies a plurality of time-of-day specific uplink and downlink beam alignment-wireless connectivity relationships for a surrounding area of each of the plurality of edge devices 104 independent of a plurality of different WCNs 110. The operation further includes distributing a different subset of information from the connectivity enhanced database 216 to each of the plurality of edge devices 104 according to a corresponding position of the each of the plurality of edge devices 104. The different subset of information causes each of the plurality of edge devices 104 to service one or more user equipment (UEs) 106 in a motion state or in a stationary state in its surrounding area independent of the plurality of different WCNs 110 and bypassing an initial access-search on the corresponding edge device.

Various embodiments of the disclosure may include a central cloud server 102 (FIG. 1). The central cloud server 102 comprises a processor 202 configured to periodically obtain sensing information from a plurality of edge devices 104. The processor 202 may be further configured to periodically obtain beam alignment information from the plurality of edge devices 104. The processor 202 may be further configured to correlate the obtained sensing information and the beam alignment information for different times-of-day such that a connectivity enhanced database 216 is generated that specifies a plurality of time-of-day specific uplink and downlink beam alignment-wireless connectivity relationships for a surrounding area of each of the plurality of edge devices 104 independent of a plurality of different wireless carrier networks 110. The processor 202 may be further configured to distribute a different subset of information from the connectivity enhanced database 216 to each of the plurality of edge devices 104 according to a corresponding position of the each of the plurality of edge devices 104, wherein the different subset of information causes each of the plurality of edge devices 104 to service one or more user equipment (UEs) 106 in a motion state or in a stationary state in its surrounding area independent of the plurality of different WCNs 110 bypassing an initial access-search on the corresponding edge device.

Various embodiments of the disclosure may include a first edge device 104A, for example, a relay device, a small cell, or an edge repeater device. The first edge device 104A comprises control circuitry 308 configured to obtain a subset of information from a central cloud server 102 according to a position of the first edge device 104A, wherein the subset of information specifies a plurality of time-of-day specific uplink and downlink beam alignment-wireless connectivity relationships for a surrounding area specific to the first edge device 104A. The control circuitry 308 may be further configured to receive a corresponding connection request from one or more user equipment (UEs) 106. Based on the obtained subset of information and the corresponding connection request, the control circuitry 308 may be further configured to service one or more user equipment (UEs) 106 in the surrounding area bypassing an initial access-search on the first edge device 104A, wherein the first edge device 104A is independent of a plurality of different wireless carrier networks (WCNs) 110 such that any one of the plurality of different wireless carrier networks 110 is used to service a specific UE in accordance with an association of the specific UE to a specific wireless carrier network.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A first edge device, comprising:
a processor configured to:
capture sensing information of a surrounding area of the first edge device;
periodically communicate the sensing information to a central cloud server, wherein the sensing information includes position information of the first edge device and a time-of-day;
obtain initial access information from the central cloud server based on the communicated sensing information;
set, based on the obtained initial access information, a first beam index for uplink communication, a second beam index for downlink communication, a Physical Cell Identity (PCID) for a base station connection, and a beam configuration to service user equipment (UEs);
communicate beam alignment information to the central cloud server;
correlate the beam alignment information with the sensing information to generate a connectivity-enhanced database, wherein the connectivity-enhanced database specifies time-of-day-specific beam alignment-wireless connectivity relationships for the surrounding area of the first edge device; and
dynamically adjust the beam configuration based on real-time environmental conditions and UE demands in the surrounding area.

2. The first edge device according to claim 1, wherein the processor is further configured to:
obtain control signals from the central cloud server;
configure parameters of amplifier gains and phase responses based on the obtained control signals, wherein the parameters are associated with one or more antenna arrays of the first edge device;
obtain wireless connectivity enhanced information from the central cloud server, wherein the wireless connectivity enhanced information includes new specific initial access information to bypass an initial access search on the first edge device; and
switch from a first base station associated with a first wireless carrier network (WCN) to a second base station associated with a second WCN, wherein the switch bypasses the initial access search and is based on the new specific initial access information.

3. The first edge device according to claim 1, wherein the processor is further configured to obtain a subset of information specific to the first edge device from the central cloud server based on a current position of the first edge device, and
the subset of information includes at least one of a plurality of time-of-day specific uplink and downlink beam alignment-wireless connectivity relationships for the surrounding area of the first edge device.

4. The first edge device according to claim 1, wherein the processor is further configured to communicate beam alignment information to the central cloud server, and
the sensing information obtained by the central cloud server is correlated for different times-of-day to generate a connectivity enhanced database, which specifies a plurality of time-of-day specific uplink and downlink beam alignment-wireless connectivity relationships for the surrounding area of the first edge device, independent of a plurality of different wireless carrier networks (WCNs).

5. The first edge device according to claim 4, wherein the beam alignment information comprises at least one of transmit (Tx) beam information, receive (Rx) beam information, an absolute radio-frequency channel number (ARFCN) used by the first edge device, or signal strength information associated with each of a Tx beam and a Rx beam of the first edge device.

6. The first edge device according to claim 5, wherein the processor is further configured to communicate processing chain parameters of the first edge device to the central cloud server, and
the processing chain parameters are further correlated with the sensing information and beam alignment information at the central cloud server to update the connectivity enhanced database for a plurality of geographical areas associated with the plurality of different WCNs.

7. The first edge device according to claim 6, wherein the processing chain parameters comprise information associated with elements of at least one of cascaded receiver chains and one or more cascaded transmitter chains of the first edge device, radio blocks information, or modem information of the first edge device.

8. The first edge device according to claim 1, wherein the obtained initial access information includes information on the first beam index, the second beam index, the PCID, a first wireless carrier network (WCN), and the beam configuration,
the first beam index, the second beam index, the PCID, the first WCN, and the beam configuration are determined by the central cloud server based on position information of the first edge device for the time-of-day and transferred to the first edge device as a part of the initial access information associated with the first WCN.

9. The first edge device according to claim 1, wherein the sensing information further comprises a moving direction of a vehicle and traffic information in a case where the first edge device is mounted on the vehicle.

10. The first edge device according to claim 1, wherein the sensing information further comprises at least two of:
   location of one or more UEs in a motion or stationary state in the surrounding area of the first edge device,
   moving direction of the one or more UEs,
   distance of the first edge device from surrounding objects, road, construction, or traffic light information.

11. The first edge device according to claim 1, wherein the position information of the first edge device is a two-dimensional (2D) position.

12. The first edge device according to claim 1, wherein the first edge device is independent of a plurality of different wireless carrier network (WCNs) such that a specific WCN of the plurality of different WCNs is used to service a specific UE of one or more UEs based on association of the specific UE to the specific WCN.

13. The first edge device according to claim 1, wherein
   in a case where the first edge device is deployed at a fixed location, the processor is further configured to generate a three-dimensional (3D) environmental representation that indicates movable and immobile physical structures in the surrounding area of the first edge device, and
   the generation of the 3D environmental representation is based on utilization of a sensing radar and one or more image-capture devices.

14. The first edge device according to claim 13, wherein the first edge device is mountable on a vehicle.

15. The first edge device according to claim 1, wherein the processor is further configured to receive a connection request from one or more UEs.

16. The first edge device according to claim 15, wherein the connection request is at least one of an out-of-band communication, a sidelink request, a vehicle-to-infrastructure (V2I) request, or a request based on a personal area network (PAN) connection.

17. The first edge device according to claim 16, wherein the processor is further configured to identify the one or more UEs, based on the connection request to service the one or more UEs in the surrounding area, to bypass an initial access search on the first edge device.

18. The first edge device according to claim 1, wherein the processor is further configured to:
   relay a first radio frequency (RF) signal of a first wireless carrier network (WCN) to a first UE of one or more UEs in a case where the first UE is subscribed to the first WCN, or
   relay a second RF signal of a second WCN to the first UE in a case where the first UE is subscribed to the second WCN.

19. The first edge device according to claim 1, wherein the processor is further configured to determine that a connection to a first base station is to be established directly or indirectly in a non-line of sight (NLOS) path using a second edge device in a network of edge devices, depending on a current position of the first edge device.

20. A method, comprising:
   in an edge device:
      capturing sensing information of a surrounding area of the edge device;
      periodically communicating the sensing information to a central cloud server, wherein the sensing information comprises at least position information of the edge device and a time-of-day;
      obtaining initial access information from the central cloud server based on the sensing information;
      setting, based on the obtained initial access information, a first beam index for uplink communication, a second beam index for downlink communication, a Physical Cell Identity (PCID) for a base station connection, and a beam configuration for servicing user equipment (UEs);
      communicating beam alignment information to the central cloud server;
      correlating the beam alignment information with the sensing information to generate a connectivity-enhanced database, wherein the connectivity-enhanced database specifies time-of-day-specific beam alignment-wireless connectivity relationships for the surrounding area of the edge device; and
      dynamically adjusting the beam configuration based on real-time environmental conditions and UE demands in the surrounding area.

* * * * *